United States Patent
Nakamura

(10) Patent No.: US 6,942,947 B2
(45) Date of Patent: Sep. 13, 2005

(54) HYDROGEN STORAGE ALLOY, PROCESS FOR PRODUCING HYDROGEN STORAGE ALLOY, HYDROGEN STORAGE ALLOY ELECTRODE, PROCESS FOR PRODUCING HYDROGEN STORAGE ALLOY ELECTRODE, AND BATTERY

(75) Inventor: Kenji Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 103 days.

(21) Appl. No.: 10/394,036

(22) Filed: Mar. 24, 2003

(65) Prior Publication Data

US 2003/0205300 A1 Nov. 6, 2003

Related U.S. Application Data

(62) Division of application No. 09/367,932, filed as application No. PCT/JP98/05934 on Dec. 24, 1998, now Pat. No. 6,602,639.

(30) Foreign Application Priority Data

Dec. 26, 1997 (JP) ............................................. 9-358955

(51) Int. Cl.$^7$ ............................ H01M 4/58; C22F 1/10; C22C 19/03
(52) U.S. Cl. .................... 429/218.2; 148/555; 148/556; 420/900
(58) Field of Search ...................... 429/218.2; 420/900; 148/538, 555, 556, 561

(56) References Cited

U.S. PATENT DOCUMENTS

| | | |
|---|---|---|
| 5,185,221 A | 2/1993 | Rampel |
| 5,306,583 A | 4/1994 | Bouet et al. |
| 5,529,857 A | 6/1996 | Nogami et al. |
| 6,053,995 A | 4/2000 | Tanibuchi et al. |
| 6,261,517 B1 * | 7/2001 | Kaneko et al. ............. 420/455 |

FOREIGN PATENT DOCUMENTS

| | | |
|---|---|---|
| CN | 1078827 A * | 11/1993 |
| EP | 0557522 A1 | 9/1993 |
| EP | 0557656 A1 | 9/1993 |
| EP | 0751229 A1 | 1/1997 |
| EP | 0765947 A1 | 4/1997 |
| JP | 60-250558 | 12/1985 |
| JP | 63-291363 | 11/1988 |
| JP | 3-46770 | 2/1991 |
| JP | 4-168240 | 6/1992 |
| JP | 4-328256 | 11/1992 |
| JP | 6-150919 | 5/1994 |

(Continued)

OTHER PUBLICATIONS

English Translation for CN 1078827 A (publication date of Nov. 24, 1993).*

IPDL JPO Machine Translation for JP 07–286225 A (publication date of Oct. 1995).*

(Continued)

*Primary Examiner*—Susy Tsang-Foster
(74) *Attorney, Agent, or Firm*—Burns, Doane, Swecker & Mathis, LLP

(57) ABSTRACT

Hydrogen storage alloy has: (1) a main composition expressed by the formula of Mm–(Ni–Al–Co–Mn–Cu); (2) a ratio of the number of atoms expressed by the formula (Ni–Al–Co–Mn–Cu) is $5.5<(Ni+Al+Co+Mn+Cu)\leq 7.0$, and $4.0\leq Ni$, when Mm is set at 1 in a ratio of the number of atoms; and (3) an internal structure having hydrogen storage alloy phase expressed by the general formula of $AB_5$ and a second phase existing in the hydrogen storage alloy phase, wherein the whole the composition is expressed by the formula of $MmiNi_{(3.95+p)}Al_{(0.3+q)}Co_{(0.4+r)}Mn_{(0.45+s)}Cu_{(0.10+t)}$, and $0.3<(p+q+r+s+t)\leq 1.8$.

12 Claims, 10 Drawing Sheets

FOREIGN PATENT DOCUMENTS

| | | | |
|---|---|---|---|
| JP | 6-256873 | | 9/1994 |
| JP | 6-306411 | | 11/1994 |
| JP | 7-50163 | | 2/1995 |
| JP | 7-157813 | | 6/1995 |
| JP | 7-230807 | | 8/1995 |
| JP | 7-258703 | | 10/1995 |
| JP | 7-278708 | | 10/1995 |
| JP | 7-286225 | | 10/1995 |
| JP | 07-286225 A | * | 10/1995 |
| JP | 8-250115 | | 9/1996 |
| JP | 8-315813 | | 11/1996 |
| JP | 8-315815 | | 11/1996 |
| JP | 9-31573 | | 2/1997 |
| JP | 9-97607 | | 4/1997 |
| WO | WO-98/10107 | * | 3/1998 |

OTHER PUBLICATIONS

Hu ("Effect of microstructure, composition, and non-stoichiometry on electrochemical properties of low-Co rare-earth nickel hydrogen storage alloys", J. of Alloys and Compounds, 279, (Oct. 2, 1998), pp. 295–300).*

The ACS abstract for CN 1078827 (publication date of Nov. 1993).*

Fukumoto et al., "Effect of the Stoichiometric Ratio on Electrochemical Properties of Hydrogen Storage Alloys for Nickel–Metal Hydride–Batteries", Electrochimica Acta, vol. 40, No. 7, pp. 845–848, 1995 (no month).

Fukumoto et al., "Effect of alloy composition on enthalpy and entropy changes of hydride formation for stoichiometric and nonstoichiometric hydrogen storage alloys", J. of Alloys and Compounds, 240, pp. 76–78 (no month) 1996.

Cunmao et al., "Second Phase and Electrode Characteristics of Rare–Earth–Based AB5+x Alloys", Journal of Alloys and Compounds, 231, 1995, pp. 546–549 (no month).

* cited by examiner

HYDROGEN STORAGE ALLOY, PROCESS FOR PRODUCING HYDROGEN STORAGE ALLOY, HYDROGEN STORAGE ALLOY ELECTRODE, PROCESS FOR PRODUCING HYDROGEN STORAGE ALLOY ELECTRODE, AND BATTERY

This application is a divisional of U.S. application Ser. No. 09/367,932, filed Oct. 25, 1999, now U.S. Pat. No. 6,602,639, which is a national stage filing under 35 USC §371 of International Application No. PCT/JP98/05934, filed on Dec. 24, 1998, which claims priority under 35 USC §119 of Japanese Application No. 9/358955, filed on Dec. 26, 1997.

FIELD OF THE INVENTION

The present invention relates to hydrogen storage alloy reversibly capable of storing and emitting hydrogen and having electric conductivity, a process for producing the hydrogen storage alloy, a hydrogen storage alloy electrode, a process for producing the hydrogen storage alloy electrode, and a battery.

DESCRIPTION OF THE RELATED ART

Conventionally, a hydrogen storage alloy has been known which shows the general formula of $AB_5$. A representative form of this hydrogen storage exhibits the hydrogen storage alloy showing a formula of $MmNi_5$ in which "A" sites in the general formula of $AB_5$ take "Mm", and "B" sites take Ni. "Mm" means misch metal. In the above-mentioned hydrogen storage alloy showing the formula of $MmNi_5$, a part of Ni is replaced by Mn, Co, Al, etc. to improve characteristic properties. Especially, the hydrogen storage alloy having the formula of $MmNi_{3.55}Al_{0.30}Co_{0.75}Mn_{0.4}$ is provided.

Also, Japanese Unexamined Patent Publication (KOKAI) 8-315,813 discloses hydrogen storage alloy which has a parent phase having a crystal structure of $CaCu_5$ (=$AB_5$) type, and a second phase having Ni and/or Co. According to this parent phase, when a ratio of the number of atoms of Mm (misch metal) is set at 1, (Ni+Co+Mn+Al) is set at 4.5–5.5 in a ratio of the number of atoms, in order to increase the degree of activation. This publication discloses that the second phase has the composition of Mo (Ni—Co)$_3$.

Also, Japanese Unexamined Patent Publication (KOKAI) No. 7-286,225 discloses another hydrogen storage alloy. This hydrogen storage alloy has a hydrogen storage alloy phase having a crystal structure of $CaCu_5$, and a second phase which is mainly composed of chemical elements not including Mm (misch metal) and which is distributed in a insular shape. In this publication, when Mm is misch metal, the hydrogen storage alloy phase has the general formula of $MmNi_xM_y$. Also, this publication discloses the hydrogen storage alloy phase having the formula expressed as $5.0 \leq (x+y) \leq 5.5$. In general hydrogen storage alloy, since stress is caused by expansion in storing hydrogen storage and by contraction in emitting hydrogen, the hydrogen storage alloy is micronized. However, the second phase, not including Mm and being dispersed in a insular shape, can decrease the stress to suppress the micronization of the alloy.

Japanese Unexamined Patent Publication (KOKAI) 8-315,813 discloses a hydrogen storage alloy electrode for an alkaline storage battery. In this publication, the parent phase of this alloy has the general formula of $Mm-(Ni-Co-Mn-Al)_x$, in which "X" is expressed as $4.5 \leq x \leq 5.5$. This parent phase has the crystal structure of $CaCu_5$, and it has a spherical shape or a particle shape exhibiting a chicken egg shape. In this alloy, the second phases are produced at particle surfaces of the hydrogen storage alloy to has a catalytic ability for storing and emitting hydrogen. The second phase is composed of intermetallic compound having a high-melting point and including Ni and/or Co.

Japanese Unexamined Patent Publication (KOKAI) 4-168,240 discloses another hydrogen storage alloy having the formula of ABx. According to this hydrogen storage alloy, the "A" site in the formula of ABx shows lantern or misch metal, and the "B" site shows at least one from the group of nickel, cobalt, aluminum, manganese, chromium, copper, and zirconium. Then, the range of "X" is set in the formula of $5.5 \leq x \leq 6.5$. This alloy can suppress micronization thereof caused by storing and emitting hydrogen. Japanese Unexamined Patent Publication (KOKAI) 4-168,240 discloses $MmNi_3Co_2Al_{0.5}Mn_{0.5}$ as the hydrogen storage alloy exhibiting the formula of Mm-(Ni-Al-Co-Mn). However, when a ratio of the number of atoms of Mm is 1, a ratio of the number of atoms of Ni is as small as 3. As a result, it is insufficient to generate an electrically conductive network having good conductivity.

In industry, the battery with a negative electrode composed of hydrogen storage alloy has been provided. Generally, when this battery is used in room temperature, the ratio between internal resistance of the positive electrode and internal resistance of the negative electrode does not indicate a large difference. This shows fundamentally the following: (internal resistance of positive electrode:internal resistance of negative electrode)=1:1

On the other hand, when the battery is used in low-temperatures, the internal resistance of negative electrode tends to relatively increase. Especially, when temperature is near 0° C., the internal resistance of the negative electrode composed of hydrogen storage alloy considerably increases. This shows fundamentally the following: (internal resistance of positive electrode:internal resistance of negative electrode)=1.3:(3–3.5).

When the battery is used in low-temperatures, the negative electrode shows a relative increasing rate in the internal resistance to restrict a battery reaction. Also, when the battery is charged at a high speed, since an exothermic reaction is generated by the internal resistance, the high-speed charging is restricted in the battery. Therefore, for ensuring the high-speed charging, it is preferable that internal resistance is low in the electrode and in the battery. In each of the hydrogen storage alloys concerning the above-mentioned publications, the second phase, showing good conductivity and including Ni, does not form a conductive network state sufficiently. Therefore, each of the above-mentioned hydrogen storage alloys is insufficient in forming an electric conductive route composed of the second phase.

Concerning Japanese Unexamined Patent Publication 4-168,240, the conductive route composed of the second phase is also insufficient.

The present invention has been developed in view of the above-mentioned circumstances. It is therefore an object of the present invention to provide hydrogen storage alloy, a process for producing the hydrogen storage alloy, a hydrogen storage alloy electrode, a process for producing the hydrogen storage alloy electrode, and a battery; which can improve electrical conductivity to decrease internal resistance and to increase power in low-temperatures and which can improve high-speed charging.

DISCLOSURE OF THE INVENTION (Invention of Hydrogen Storage Alloy)

① Hydrogen storage alloy according to a first aspect comprises: (1) a main composition expressed by the formula of Mm–(Ni–Al–Co–Mn); (2) a ratio of the number of atoms expressed by the formula of (Ni–Al–Co–Mn) is exhibited as $5.5<(Ni+Al+Co+Mn)\leq 9$, and $3.5\leq Ni$, when Mm is set at 1 in a ratio of the number of atoms; and (3) an internal structure having a hydrogen storage alloy phase expressed by the general formula of $AB_5$, and a second phase existing in the hydrogen storage alloy phase.

"Mm" means misch metal. The misch metal means an aggregate of rare earth elements such as Ce and La.

According to the hydrogen storage alloy concerning the first aspect, when the total quantity of ratio of the number of atoms of (Ni+Al+Co+Mn) is 5.5 or less, the second phase showing good conductivity decreases relatively, a conductive network composed of the second phase is not sufficiently formed, and the internal resistance of the hydrogen storage alloy increases; therefore, not obtaining an effect that power is improved.

Meanwhile, when the total quantity of ratio of the number of atoms of (Ni+Al+Co+Mn) exceeds 9, the conductive network composed of the second phase increases excessively, the hydrogen storage alloy phase decreases relatively; therefore, not obtaining a sufficient ability in storing and emitting hydrogen. Considering the above-mentioned circumstance, the total quantity of ratio of the number of atoms of (Ni+Al+Co+Mn) can be chosen on occasion. In the hydrogen storage alloy concerning the first aspect, the lower limit of the total quantity of (Ni+Al+Co+Mn) can be, for example, 5.6, 5.7, 5.8, 6.0, 6.2, 6.6, 6.7, etc.: the upper limit of the total quantity can be, for example, 8.8, 8.6, 8.4, etc. According to the hydrogen storage concerning the first aspect, the reason for restricting $3.5\leq Ni$ is that the second phase including Ni to have good conductivity is easily generated in a network state. In this case, the ratio of number of atoms of Ni can be, for example, 3.6, 3.7, 3.8, 3.96, etc. as the lower limit.

Hydrogen storage alloy according to the first aspect may preferably be expressed as follows: the whole composition is $MmNi_{(3.55+a)}Al_{(0.3+b)}Co_{(0.75+c)}Mn_{(0.4+d)}$, and $0.5<x(=a+b+c+d)\leq 4$. The above-mentioned formula of $MmNi_{(3.55+a)}Al_{(0.3+b)}Co_{(0.75+c)}Mn_{(0.4+d)}$ is the meaning of $MmNi_{3.55+a}Al_{0.3+b}Co_{0.75+c}Mn_{0.4+d}$. A large letter may sometimes be used on occasion in the present specification in accordance with a printing machine.

The reason for restricting $0.5<x(=a+b+c+d)\leq 4$ is fundamentally the same as the above-mentioned reason. That is to say, when the "x" value is 0.5 or less, the second phase having good conductivity decreases relatively, the conductive network composed of the second phase is not sufficiently formed, the internal resistance of the hydrogen storage alloy increases, and the a power-improving effect is not sufficiently obtained. Meanwhile, when the "x" value exceeds 4, the conductive network composed of the second phase increases excessively, the hydrogen storage alloy phase decreases relatively; therefore, not obtaining a sufficient ability in storing and emitting hydrogen. Considering the above-mentioned circumstance, the quantity of "x" can be chosen on occasion. The alloy according to the first aspect can choose, for example, 0.6, 0.7, 0.8, 0.9, etc. as the lower limit of the quantity of "x": it can choose, for example, 3.8 3.6, etc. as the upper limit of the quantity of "x".

② Hydrogen storage alloy according to a second aspect comprises: (1) a main composition expressed by the formula of Mm–(Ni–Al–Co–Mn–Mo); (2) a ratio of the number of atoms expressed by the formula of (Ni–Al–Co–Mn–Mo) is exhibited as $5.5<(Ni+Al+Co+Mn+Mo)\leq 8$, and $3.5\leq Ni$, when Mm is set at 1 in a ratio of the number of atoms; and (3) an internal structure having a hydrogen storage alloy phase expressed by the general formula of $AB_5$, and a second phase existing in the hydrogen storage alloy phase.

According to the hydrogen storage alloy concerning the second aspect, when the total quantity of ratio of the number of atoms of (Ni+Al+Co+Mn+Mo) is 5.5 or less, the second phase showing good conductivity decreases relatively, a conductive network composed of the second phase is not sufficiently formed, and the internal resistance of the hydrogen storage alloy increases; therefore, not obtaining an effect that power is improved. Meanwhile, when the total quantity of ratio of the number of atoms of (Ni+Al+Co+Mn+Mo) exceeds 8, the conductive network composed of the second phase increases excessively, the hydrogen storage alloy phase decreases relatively; therefore, not obtaining a sufficient ability in storing and emitting hydrogen. Considering the above-mentioned circumstance, the total quantity of ratio of the number of atoms of (Ni+Al+Co+Mn+Mo) can be chosen on occasion. In the hydrogen storage alloy concerning the second aspect, the lower limit of the total quantity of (Ni+Al+Co+Mn+Mo) can be, for example, 5.6, 5.7, 5.8, 6.0, 6.2, 6.6, 6.8, etc,: the upper limit of the total quantity can be, for example, 7.8 7.6, 7.4, etc. According to the hydrogen storage concerning the second aspect, the reason for restricting $3.5\leq Ni$ is that the second phase including a plenty of Ni to have good conductivity is easily generated. In this case, the ratio of the number of atoms of Ni can be, for example, 3.6, 3.7, 3.8, 3.96, etc. as a lower limit.

The whole composition of hydrogen storage alloy according to the second aspect may be expressed as follows: $MmNi_{(3.55+i)}Al_{(0.3+j)}Co_{(0.75+k)}Mn_{(0.4+l)}Mo_{(m)}$, and $0.5<(i+j+k+l+m)\leq 3$.

In the hydrogen storage alloy concerning the second aspect, the reason for restricting $0.5<(i+j+k+l+m)\leq 3$ is fundamentally the same as the above-mentioned reason. That is to say, when (i+j+k+l+m) is 0.5 or less, the second phase having good conductivity decreases relatively, the conductive network composed of the second phase is not sufficiently formed, and the internal resistance of hydrogen storage alloy increases; therefore, not obtaining the effect for improving power. Meanwhile, when (i+j+k+l+m) exceeds 3, the conductive network composed of the second phase increases excessively, the hydrogen storage alloy phase decreases relatively; therefore, not obtaining a sufficient ability of hydrogen storage and hydrogen emission. Considering the above-mentioned circumstance, the total quantity of ratio of the number of atoms of (i+j+k+l+m) can be chosen on occasion. In the hydrogen storage alloy concerning the second aspect, the total quantity of ratio of the number of atoms of (i+j+k+l+m) can be, for example, 0.6, 0.7, 0.8, etc. as a lower limit: it can be, for example, 2.9, 2.8, etc. as an upper limit.

③ Hydrogen storage alloy according to a third aspect comprises: (1) a main composition expressed by the formula of Mm–(Ni–Al—Co–Mn–Cu); (2) a ratio of the number of atoms expressed by the formula of (Ni–Al—Co–Mn–Cu) is exhibited by $5.5<(Ni+Al+Co+Mn+Cu)\leq 7.0$, and $4.0\leq Ni$, when Mm is set at 1 in a ratio of the number of atoms; and (3) an internal structure having a hydrogen storage alloy phase expressed by the general formula of $AB_5$, and a second phase existing in the hydrogen storage alloy phase.

The hydrogen storage alloy according to the third aspect intends to ensure performance of hydrogen storage alloy, while reducing expensive Co (cobalt) as much as possible.

Thus, Cu and Ni are mainly used instead of part of expensive Co. According to the hydrogen storage alloy concerning the third aspect, when the total quantity of ratio of the number of atoms of (Ni+Al+Co+Mn+Cu) is 5.5 or less, the second phase decreases relatively, the conductive network composed of the second phase is not sufficiently formed, and the internal resistance of the hydrogen storage alloy increases; therefore, not obtaining effect for improving power.

Meanwhile, when the total quantity of ratio of the number of atoms of (Ni+Al+Co+Mn+Cu) exceeds 7.0, the conductive network composed of the second phase becomes superfluous, and the hydrogen storage alloy phase decreases relatively not to obtain ability of hydrogen storage and hydrogene emission.

Considering the above-mentioned circumstance, the total quantity of ratio of the number of atoms of (Ni+Al+Co+Mn+Cu) can be chosen on occasion. The hydrogen storage alloy according to the third aspect can choose, for example, 5.6, 5.8, 6.0, 6.2, etc. as a lower limit of this total quantity: it can choose 6.8, 6.6, 6.4, etc. as an upper limit. According to the hydrogen storage alloy concerning the third aspect, the reason for restricting $4.0 \leq Ni$ is that the second phase having mainly Ni to show good conductivity is easily formed in a network state. In this case, the alloy concerning the third aspect can choose 4.2, 4.4, etc. as a lower limit of the number of atoms of Ni. According to the hydrogen storage alloy concerning the third aspect, since Ni is added instead of apart of Co, the lower limit of the quantity of Ni is larger than that of the second aspect.

According to the hydrogen storage alloy concerning the third aspect, the whole composition is expressed as follows: $MmNi_{(3.95+p)}Al_{(0.3+q)}Co_{(0.4+r)}Mn_{(0.45+s)}Cu_{(0.10+t)}$, and $0.3<(p+q+r+s+t) \leq 1.8$. The reason for restricting the formula of $0.3<(p+q+r+s+t) \leq 1.8$ is fundamentally the same as the above-mentioned reason. That is to say, when the total quantity of ratio of the number of atoms of (p+q+r+s+t) is 0.3 or less, the second phase having good conductivity decreases relatively, and the conductive network composed of the second phase is not sufficiently formed, and the internal resistance of the hydrogen storage alloy increases not to obtain the effect for improving power.

Meanwhile, when the total quantity of ratio of the number of atoms of (p+q+r+s+t) exceeds 1.8, the conductive network composed of the second phase becomes excessive, and the hydrogen storage alloy phase decreases relatively not to obtain a sufficient ability of hydrogen storage and hydrogene mission. Considering the above-mentioned circumstance, the total quantity of ratio of the number of atoms of (p+q+r+s+t) can be chosen on occasion. For example, the total quantity can be, for example, 0.4, 0.5, 0.6, 0.7, etc. as a lower limit: it can be 1.6, 1.4, etc. as an upper limit. The value of "t" concerning Cu can be chosen in accordance with required cost of the hydrogen storage alloy, and Co quantities being contained in the hydrogen storage alloy, etc. The lower limit of the value of "t" can be, for example, 0.02, 0.05, 0.1, 0.2, etc. However, it is not limited to this region. According to the hydrogen storage alloy concerning the third aspect, based on Table 5 described later, as for "q" concerning Al, the lower limit of "q" can be, for example, 0.04, 0.05, etc. Also, as for "s" concerning Mn, the lower limit can be 0.10, 0.14, etc. With an increase of the value of "q" and "s": namely, with an increase of Al quantity, or with an increase of Mn quantity, a hydrogen equilibrium pressure of the hydrogen storage alloy is generally decreased.

A preferable mode of the hydrogen storage alloy concerning the third aspect can satisfy at least one of the condition of (q>0.06) and the condition of (s>0.18). In this case, the hydrogen equilibrium pressure of the hydrogen storage alloy decreases by increasing of Al quantity and by increasing of Mn quantity. The preferable mode can satisfy both the condition of (q>0.06) and the condition of (s>0.18).

④ According to the hydrogen storage alloy concerning the first, the second, and the third aspects, since the conductive network is easily formed in the inside of the hydrogen storage alloy, conductivity of the hydrogen storage alloy increases, and internal resistance of the hydrogen storage alloy is reduced. In addition, since the conductive route becomes minute in the inside of the hydrogen storage alloy, the biased dispersion of current density is reduced in the hydrogen storage alloy. Also, the conductive network is composed of the second phase which can work as a catalysis for storing and emitting hydrogen. Therefore, the ability of hydrogen storage and hydrogen emission can be much improved. Especially, when the hydrogen storage alloy is used in low-temperatures such as winters, power can be improved, (Invention of Producing Hydrogen Storage Alloy)

① A process for producing hydrogen storage alloy concerning a fourth aspect, which comprises the steps of: employing a molten metal of one composition of hydrogen storage alloy concerning the above-mentioned aspects; solidifying the molten metal at a rapid cooling speed to form a solidified hydrogen storage alloy; and keeping the solidified hydrogen storage alloy at a range from 1000 to 1200° C. for 30 minutes-120 hours to precipitate a second phase having a network state. Heating time can be chosen in accordance with size of the hydrogen storage alloy, etc. According to the process concerning the fourth aspect, when the molten metal solidified rapidly, alloying elements dissolve in supersaturation, and few or no second phase is precipitated; however, the second phase is effectively precipitated in the hydrogen storage alloy when it is heat-treated. According to the process concerning the fourth aspect, the conductive network, composed of the second phase being precipitated by heat treatment, is minute because the crystal grains are minutely generated by rapid solidification. Since the conductive network is minute, the process concerning the fourth aspect can reduce a biased dispersion of current density in the hydrogen storage alloy; therefore, it can contribute to uniform electric conductivity. In addition, the process concerning the fourth aspect can also contribute to improvement of the catalysis ability to suppress the partial over-charge and over-discharge when the hydrogen storage alloy is used in the battery. The process concerning the fourth aspect can use a molten-quenching method wherein molten metal is brought in contact with a rotor such as a cooling roller so as to form pieces or powder and that is well-known as rapid solidification. According to the process concerning the fourth aspect, a cooling rate may preferably be a speed over $10^4$ K/sec. especially over $10^5$ K/sec. As for the structure refinement caused by the rapid solidification, an average particle size and an average thickness of hydrogen storage alloy are preferably below 15 $\mu$m, below 10 $\mu$m. or below 5 $\mu$m.

② A process for producing the hydrogen storage alloy according to a fifth aspect, which comprises the steps of: employing a molten metal of hydrogen storage alloy having the composition concerning the above-mentioned aspects; solidifying the molten metal to form a lump body; crushing the lump body to form a crushed hydrogen storage alloy; and hydrogenating the crushed hydrogen storage alloy for further crushing. According to the process concerning the fifth aspect, since the molten metal of the alloy solidifies as the lump body such as an ingot, the solidification speed is not rapid. Therefore, the second phase forming the conductive network is precipitated by solidification. It is considered that the second phase is precipitated in a network state at a grain boundary of the hydrogen storage alloy phase. The process concerning the fifth aspect allows the hydrogenation for further crushing to be carried out—by storing and emitting hydrogen with respect to the crushed particles which is created by crushing the lump body. In this case, since the crystal lattice of the hydrogen storage alloy phase swells and contracts repetitiously by storing and emitting hydrogen; therefore, the hydrogen storage alloy phase becomes easy to be broken minutely. Therefore, the second phase having good conductivity, buried in the inside of the hydrogen storage alloy phase, is easily exposed at the outside of the hydrogen storage alloy phase by crushing. Exposing the second phase in hydrogen storage alloy can increase electrical contact between the second phases in adjoining alloy powder so as to improve electrical conductivity in the hydrogen storage alloy. The powder crushed by the hydrogenation may be, for example, under 300 mesh (powder size: 45 $\mu$m or less), or under 200 mesh (powder size: 75 $\mu$m or less). "Under 300 mesh" means that powder passes through a 300 mesh.

(Invention of Hydrogen Storage Alloy Electrode, and Invention of Process for Producing Hydrogen Storage Alloy Electrode)

Hydrogen storage alloy electrode according to a sixth aspect, which is characterized by a material constituted by the hydrogen storage alloy having at least one composition of the above-mentioned aspects. According to this hydrogen storage alloy electrode, the second phase with the conductivity is formed in a network state to improve conductivity of the electrode itself and to improve power of the battery. Especially, the power of the battery can be improved in low-temperatures such as winters, etc. Also, when the battery is charged at high speed, the internal resistance of the electrode is reduced to decrease an exothermic reaction resulting from the internal resistance, and thereby the high-speed charging is much improved. In addition, since the electrically conductive network is minute, partial over-charge and partial over-discharge are effectively suppressed. The sixth aspect can use a system in which the powder of hydrogen storage alloy is combined with binder material, another system in which it is sintered by electrical welding, and another system in which it is sintered in a heat-treating furnace.

Hydrogen storage alloy electrode according to a seventh aspect, which comprises the steps of: employing hydrogen storage alloy having a powder shape and having a composition concerning one of the above-mentioned aspects; forming a mixture in which the hydrogen storage alloy and binder material are mixed; combining the mixture with a current collector to form a hydrogen storage alloy electrode. The mixture is generally slurry or paste. The conventional method can substantially be used in combining the mixture, having the form of slurry or paste, with the current collector. Therefore, the process concerning the seventh aspect can decrease the internal resistance of hydrogen storage alloy to increase conductivity, and it can use conventional equipment to suppress cost of equipment. The current collector is preferably porous. In this case, pores of the current collector are filled with the mixture.

A process for producing hydrogen storage alloy electrode according to an eighth aspect, which comprises the steps of: employing a hydrogen storage alloy having a powder shape and having a composition concerning one of the above-mentioned aspects; compressing the hydrogen storage alloy by press-working to form a compressed body without using binder material and without using a current collector; and sintering the compressed body to form a hydrogen storage alloy electrode. In the process concerning the eighth aspect, powder particles are directly connected, without using the binder material having difficulty in conductivity. Therefore, this aspect is advantageous in directly-connecting the second phases of the hydrogen storage alloy particle. So, conductivity of the boundary between particles is much improved: conductivity of the electrode is improved, and power of the battery is improved. Especially, power of the battery is improved in low-temperatures. Further, when the battery is charged at a high speed, the internal resistance of the electrode decreases to reduce an exothermic reaction resulting from the internal resistance; so, the high-speed charging of the battery is improved. The current collector may preferably be porous. This allows pores of the current collector to be filled with the mixture.

(Invention of Battery)

A battery according to the present invention comprises: a negative electrode generating a negative electrode reaction; and a positive electrode generating a positive electrode reaction, wherein the negative electrode is characterized by the hydrogen storage alloy having a composition concerning one of the hydrogen storage alloy concerning the above-mentioned aspects.

The battery concerning the present invention can improve conductivity of the negative electrode so as to improve power of the battery, while ensuring a hydrogen-storing ability and a hydrogen-emitting ability of the negative electrode. Especially, power of the battery can be improved, even in low-temperatures such as winters, etc. Also, when the battery is charged at a high speed, since the internal resistance of the electrode decreases to reduce an exothermic reaction, the high-speed charging of the battery is improved.

(Related Matter)

① Since the hydrogen storage alloy is restricted in the above-mentioned composition, the second phase having good conductivity is easily formed in a network state in the inside of the organization. Therefore, the conductivity is improved in the hydrogen storage alloy. So, use of this hydrogen storage alloy as an electrode allows electric charges to be carried out quickly so as to obtain good conductivity. It is known that Ni has a catalyst ability in storing and emitting hydrogen in the hydrogen storage alloy. In the case where the second phase contains Ni, or in the case where the second phase is mainly composed of Ni, the second phase has a good catalyst ability to promote a hydrogen-storing reaction and a hydrogen-emitting reaction, and power is further improved. That is to say, the hydrogen storage alloy concerning the present invention has a hydrogen-storing ability and a catalytic ability for promoting the reaction. Especially, when the hydrogen storage alloy is used as the battery for electric automobile, power of the battery is improved by promoting hydrogen storage and hydrogen emission in low-temperatures so as to increase the high-speed charging of the battery.

② The second phase, having good conductivity, of the present invention may generate the crystal structure having a Ni type or an $AlNi_3$ type, or the crystal structure having a $\mu$-NiMoCo type or a $Co_7Mo_6$ type.

Especially, the present inventor confirmed the hydrogen storage alloy by means of X-ray diffraction as follows: in the hydrogen storage alloy concerning the first aspect, it was confirmed that the second phase has the crystal structure having the Ni type or the $AlNi_3$ type. In the hydrogen storage alloy concerning the second aspect, it was confirmed that the second phase has the crystal structure having the μ-NiMoCo type or the $Co_7Mo_6$ type. In the hydrogen storage alloy concerning the third aspect, it was confirmed that the second phase has the crystal structure having the Ni type or the $AlNi_3$ type.

③ In the hydrogen storage alloy according to the present invention, a phase rate of the second phase is based on the above-mentioned composition. The phase rate may be, for example, 6–36 wt %. It is not limited to this region. "X" value (x=a+b+c+d) may be 3.9, 3.8 or less, and "y" value (y=i+j+k+l+m) may be 2.9, 2.8 or less, in such a manner that the second phase becomes 30% or less, and 33% or less in the hydrogen storage alloy by weight.

④ According to the hydrogen storage alloy concerning the present invention, the quantity of La being occupied in the misch metal (Mm) can be chosen on occasion. As described later, when the quantity of La (lanthanum) being occupied in the misch metal (Mm) closes to 100%, a hydrogen equilibrium pressure lowers. This can advantageously prevent an increase caused by repeated cycles in the internal pressure of the battery when the hydrogen storage is used in the battery.

THE BEST MODE FOR CARRYING OUT THE PRESENT INVENTION

Figure 1:
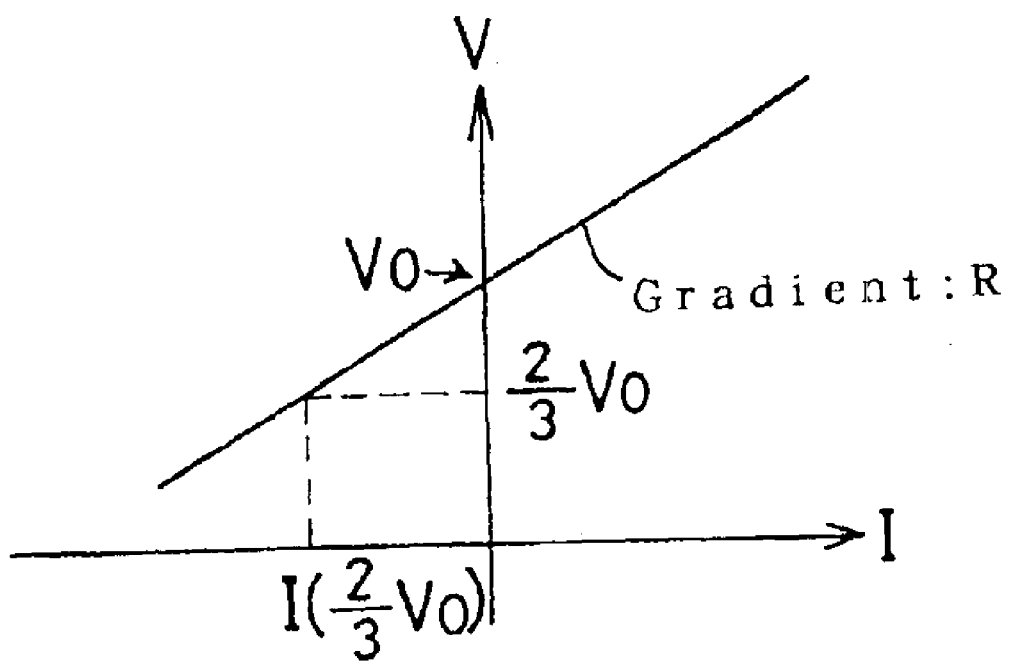
FIG. 1 is a graph which shows a current-voltage (I-V) characteristic.

The best mode for carrying out the present invention will be explained based on the present examples with comparable examples.

(1) Composition of Hydrogen Storage Alloy

The present inventor prepared alloys being compounded at an aimed composition (it is expressed when "Mm" is 1 at a ratio of the number of atoms) shown by No.1–No.9 in Table 1. The present inventor melted this alloy by the arc melting method to form a solidified body, crushing the solidified body by a tungsten mortar to form powder of the hydrogen storage alloy, so that the powder was adjusted in such a manner that particle sizes of 45–75 μm occupy 60 wt % and the remainder is in the range of 45 μm or less. In this case, Base 1 (Comparable Example A) which is No. 1, was set to be a standard. Base 1 has the composition of $MmNi_{3.55}Al_{0.3}Co_{0.75}Mn_{0.4}$, when "Mm" is misch metal. Hydrogen storage alloys concerning No.2–No.9 shown in Table 1 are formed by increasing alloying elements to Base 1, and the composition formula is expressed by $MmNi_{(3.55+a)}Al_{(0.3+b)}Co_{(0.75+c)}Mn_{(0.4+d)}$. Alloying elements are variously changed in the range shown by 0.5<x=(a+b+c+d)≦4, when (a+b+c+d)=x.

In other words, in Base 1 (Comparable Example A) which is No.1, values of "a"–"d" and "x" are set at 0, respectively. Namely, Base 1 has the conventional composition of $MmNi_{3.55}Al_{0.3}Co_{0.75}Mn_{0.4}$.

Base 1 is the hydrogen storage alloy in which (Ni+Al+Co+Mn) is expressed by 5.0 (5.0=3.55+0.3+0.75+0.4). A phase rate of the second phase of Base 1 shows 0%.

Comparable Example B, No.2, shows the formula of (Ni+Al+Co+Mn) is 5.5, and "x" value is 0.5. Comparable Example B, No.2, shows a phase rate of the second phase is as small as 5.7 wt %.

No.3–No.9 correspond to the present invention, the total quantity of ratio of the number of atoms of (Ni+Al+Co+Mn) is 6.0–9.0, and Ni is over 3.5, as shown in Table 1. In No.3–No.9, the second phase rates are in the range of 9–33 wt %, respectively: it is comparatively abounding.

The present inventor, using the hydrogen storage alloy concerning No.3–No.9 corresponding to the present invention, examined an internal structure by X-ray diffraction (XRD). According to X-ray diffraction, these hydrogen storage alloys are composed of the hydrogen storage alloy phase expressed by the general formula of $AB_5$, and the second phase having the crystal structure of the Ni type or the $AlNi_3$ type to has Ni-high content. The second phase has a network state.

(2) Battery Assembly and Activation

Table 2 shows the producing technique concerning Examples 1–12. Table 2 also shows the producing technique concerning Comparable Example 1. The present inventor used 2.0–2.2 g of the hydrogen storage alloy shown by No.1–No.9 in Table 1, respectively. Then, the present inventor formed a plurality of negative electrodes based on the producing technique of Examples 1–12 shown in Table 2. By combining this negative electrode and this positive electrode, the present inventor produced a negative electrode regulation battery having the sintered positive electrode. In this battery, a capacity ratio of (positive electrode/negative electrode) is more than 10. In activation treatment, in the first cycle, the present inventor charged it at 20 mA/g for 20 hours, and discharged it to 1 V at 50 mA/g. After the first cycle, the present inventor charged it at 50 mA/g for 6 hours, discharged it to 1V, and successively repeated about 10 times until the capacity is saturated.

(3) Measurement of Power Density

Using the above-mentioned battery, equipped with the negative electrode formed by the producing technique concerning Examples 1–12, the present inventor adjusted it in order to become SOC50% at room temperature. "SOC50%" means a charging of 50% with respect to the full charge. Afterwards, the present inventor held the battery in a constant temperature oven (target temperature: at 0° C. and 25° C.) for 2 hours.

Then, the present inventor charged and discharged the battery in order of -⅓C, ⅓C, -1C, 1C, -3C, 3C, -6C, and 6C, for each 10 seconds, while setting a pause for 5 minutes; therefore, measuring current-voltage characteristics of the battery based on the relation ship between each current value and a voltage value at the 10th second. FIG. 1 shows an I-V characteristic property, namely, a current-voltage characteristic property. In FIG. 1, power value "P" of the battery is calculated based on the following equation 1, from the gradient "R" (=internal resistance) and the section "$V_0$"

(=release electromotive force) exhibited in the I-V characteristic line ($V=RI+V_0$). Output value "P" divided by the weight of hydrogen storage alloy, constituting the negative electrode, means a value of power density. Equation 1 is based on the case of the lead storage battery.

Equation 1:

$$\begin{aligned}\text{battery power } P &= (2/3)V_0 \times I \\ &= (2/3)V_0 \times (V_0/(3R)) \\ &= (2 \cdot V_0^2)/(3^2 \cdot R)\end{aligned}$$

where "I" is a value of current at ($\frac{2}{3} \cdot V_0$).

(4) Test Result

Figure 2:
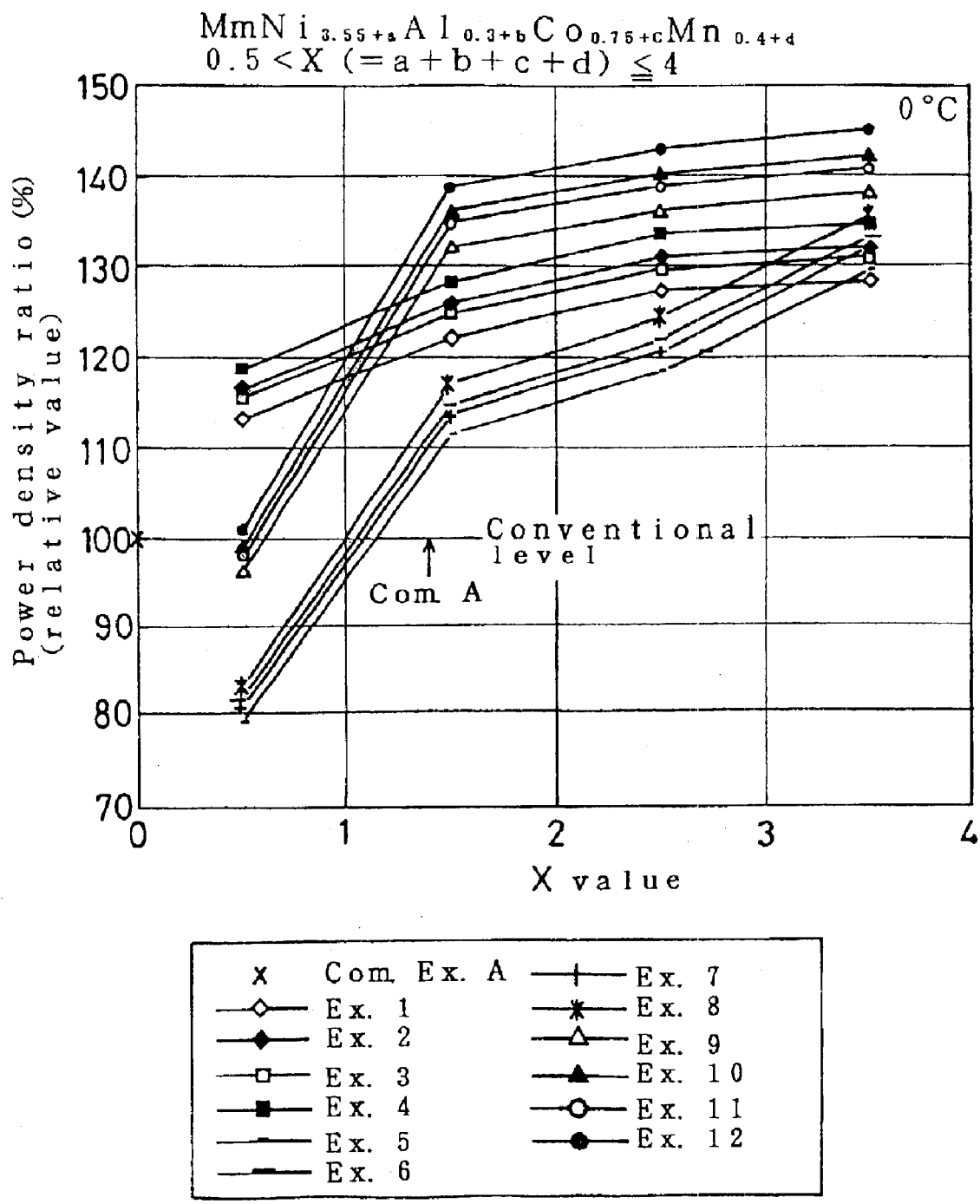
FIG. 2 is a graph which shows a relationship between "x" value (x=a+b+c+d) and power density ratio at 0° C.
Figure 3:
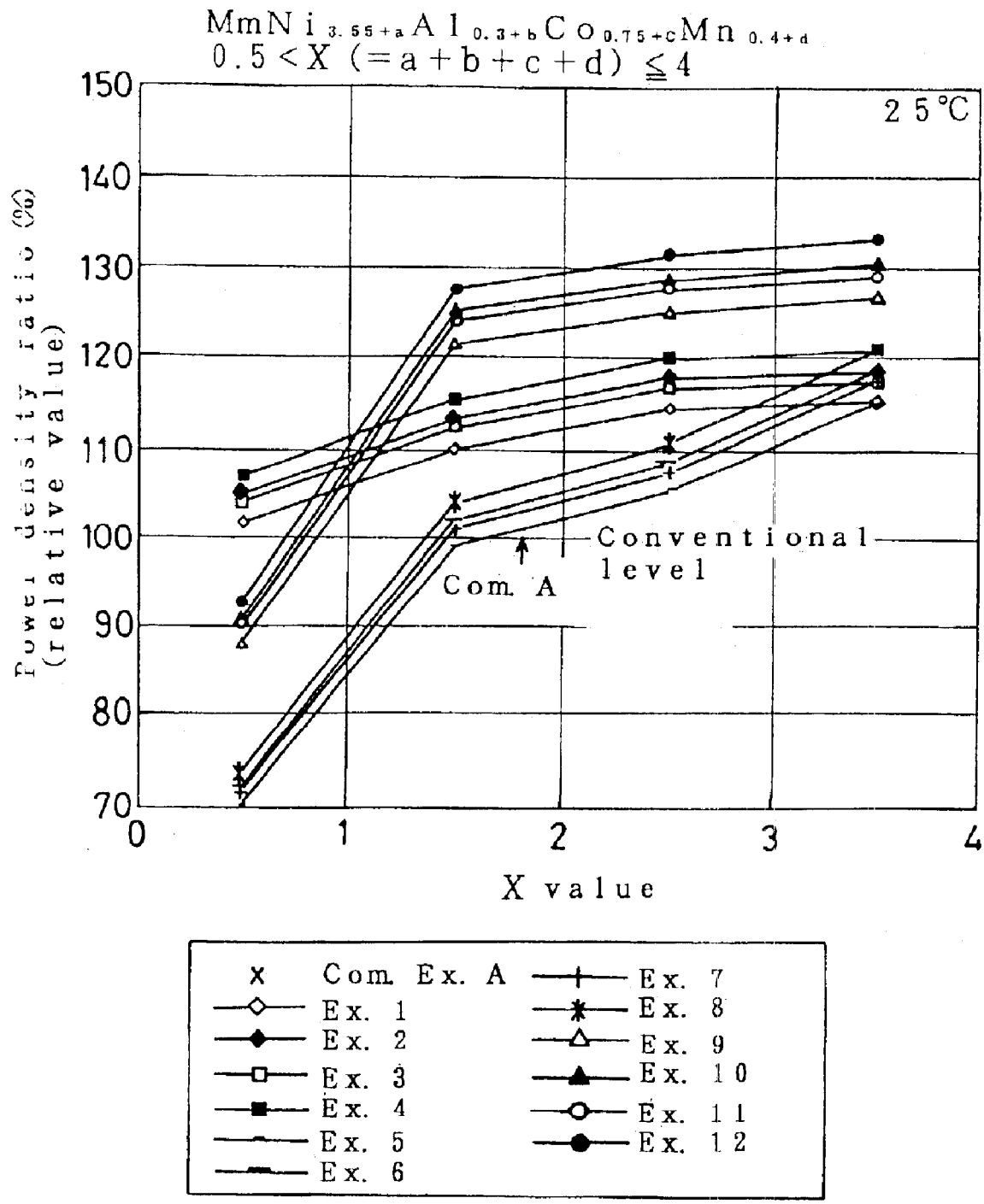
FIG. 3 is a graph which shows a relationship between "x" value (x=a+b+c+d) and power density ratio at 25° C.

The present inventor measured the power density of the battery with the negative electrode which is formed by producing technique concerning Examples 1–12. FIGS. 2 and 3 show the test results. FIG. 2 shows the test results in 0° C. FIG. 3 shows the test results in 25° C. Comparable Example A in FIG. 2 and FIG. 3 is shown by mark of "X". Comparable Example A means the battery including the negative electrode formed by using the hydrogen storage alloy having the No.1 composition (conventional composition) in Table 1, and by using the producing technique of Comparable Example 1 (machine crushing+binder material+current collector) in Table 2. In FIGS. 2 and 3, the vertical line shows power density of ratio the battery, wherein it shows the relative value when the power density of battery produced by Comparable Example A is set at 100%. The horizontal line of FIGS. 2 and 3 shows "x" value (x=a+b+c+d). The test for measuring the power density ratio was executed with respect to the hydrogen storage alloys in which the "x" value is 0.5, 1.5, 2.5, and 3.5, respectively. As understood from the characteristic line of FIG. 2 in which the test temperature is 0° C., and the characteristic line of FIG. 3 in which the test temperature is 25° C., in the battery including the negative electrode produced by Examples 1–12, the right-increasing characteristics are obtained. In other words, the power density ratio of the battery increases with an increase of "x" value (x=a+b+c+d). Especially when "x" value is 1.5, 2.5, 3.5, the power density ratio is higher. When the "x" value exceeds 4, the second phase working as the conductive route increases relatively, and the hydrogen storage alloy phase having hydrogen-storing ability and hydrogen-emitting ability decreases relatively. Therefore, the power density ratio of the battery becomes a decline, when the "x" value exceeds 4. According to the characteristic line of FIG. 3 exhibiting a test temperature of 25° C., the power density ratio is 130–135%. According to the characteristic line of FIG. 2 exhibiting a test temperature of 0° C., the power density ratio sometimes exceeds 140%. In other words, as understood from comparison between FIGS. 2 and 3, the power density ratio is improved in the characteristic line of FIG. 2 than that in the characteristic line of FIG. 3—the test temperature in FIG. 2 is 0° C., and the test temperature in FIG. 3 is 25° C.

Therefore, in the battery having the negative electrode composed of the hydrogen storage alloy concerning the present invention, power characteristics in low-temperatures are improved in comparison with the battery having the negative electrode composed of the conventional hydrogen storage alloy.

Table 2 shows items of ①–⑧ as a producing technique. The items of ①–⑧ in Table 2 will be explained hereinafter.

① Machine Crushing:

The present inventor melted the molten metal with the target alloy composition by an arc melting method, solidified it to form an ingot. The present inventor crushed the ingot by a tungsten mortar. As a result, the alloy powder was produced in which 60 wt % of the whole powder was in the range of 45–75 μm in particle size, and the remainder is in the range of 45 μm or less.

② Machine Crushing+Hydrogenation Crushing:

The present inventor melted the molten metal with the target alloy composition by an arc melting method, solidified it to form an ingot. The present inventor crushed the ingot to be approximately 100 meshes by a crushing machine. Afterwards, the present inventor repeated hydrogen-storing treatment under a hydrogen atmosphere and hydrogen-emitting treatment. As a result, the hydrogen storage alloy was crushed by means of hydrogenation so that the powder became in the range of under 300 mesh.

③ Rapid Solidification and Heat Treatment:

The present inventor melted the molten metal with the target alloy composition, hitting the molten metal to a cooling roller by a roll quenching method to rapidly solidify the molten metal at a cooling speed over $10^5$ K/sec. As a result, ribbon pieces (wall thickness: 10–100 μm) were produced as a solidified piece having minute crystals of average particle size 10 μm or less. Afterwards, the present inventor executed a heat treatment in which ribbon pieces were kept at 1200° C. in an inert atmosphere (argon gas atmosphere) for 60 minutes.

④ Machine Crushing:

The present inventor mechanically crushed the ribbon pieces after the heat treatment. Therefore, the alloy powder was produced in which 60 wt % of the whole powder was in the range of 45–75 μm in particle size, and the remainder was in the range of 45 μm or less.

⑤ Machine Crushing+Hydrogenation Crushing:

The present inventor mechanically crushed the ribbon pieces after the heat treatment. Therefore, the alloy powder was produced in which 60 wt % of the whole powder was in the range of 45–75 μm in particle size and the remainder was in the range of 45 μm or less.

Afterwards, the present inventor repeated a hydrogen-storing treatment under a hydrogen atmosphere and a hydrogen-emitting treatment to produce the hydrogen storage alloy having the range of under 300 mesh by means of hydrogenation.

⑥ Use of Binder Material and Current Collector:

The present inventor formed a slurry by mixing hydrogen storage alloy powder with binder material (carboxymethylcellulose) working as a binder material, alcohol and water working as a solvent. Next, the present inventor coated the slurry onto a current collector composed of porous nickel to dry it, compressing it in a plate shape (thickness: about 300 μm) to form a electrode (negative electrode) by press-forming. The porous nickel is produced by burning an organic substance coated by a nickel film.

⑦ Energization Sintering:

The present inventor compressed an aggregate of the powder of hydrogen storage alloy to form a plate (thickness: about 300 μm) by press-forming. Afterwards, the present inventor supplied electric current to the compressed body in an inert atmosphere in a thickness direction so as to weld and sinter the contacting area of the powder particles by electric resistance welding. The electric current density was at 1A/cm², and the welding time was about 2 seconds. According to this method, the second phases of powder particles adjoining each other is connected by the electric resistance welding.

⑧ Sintering in Sintering Furnace:

The present inventor compressed an aggregate of the hydrogen storage alloy powder to be about 300 μm in thickness to form a compressed body by press-forming. Afterwards, the present inventor sintered contacting areas in the powder particle by heating the compressed body in a sintering furnace—temperature was 1200° C. and heating time was 30 minutes—having a reducibility atmosphere in which hydrogen gas flows. This allows a good conductivity in the second phase of the powder particle.

Then, the present inventor formed the negative electrode using the hydrogen storage alloy which has the formula of x=(a+b+c+d)=1.5, based on the producing technique concerning Example 1. This inventor installed the negative electrode to the battery to measure the internal resistance of the battery. In addition, the present inventor formed the negative electrode using the hydrogen storage alloy which has the formula of y=(i+j+k+l+m)=1.0, installing the negative electrode in the battery to measure the internal resistance of the battery. In both of 0° C. and 25° C., the internal resistance was measured. Also, the present inventor formed the battery having: the negative electrode using the hydrogen storage alloy which has the formula of "x"=0; and the negative electrode using the hydrogen storage alloy which has the formula of "y"=0, respectively. This inventor also measured the internal resistance about these batteries. Table 3 shows relative values of the internal resistance with respect to Comparable Example (x=0) and Comparable Example (y=0). When the "x" value (x=a+b+c+d) is 1.5, as understood from Table 3, the internal resistance in 0° C. shows 80.4%, the internal resistance in 25° C. shows 78.2%. When the "y" value (y=i+j+k+l+m) is 1.0, the internal resistance in 0° C. shows 94.7%, the internal resistance in 25° C. shows 74.2%. Therefore, the battery shows a good power in low-temperatures.

By the way, the present inventor coated the slurry including the hydrogen storage alloy powder shown in the above-mentioned ⑥ onto the electrode having a current collector composed of the porous nickel, pressing it to form the electrode. In this case, the current collector composed of the porous nickel has a larger conductive route. The reason is as follows: the organic substance covered with a nickel film is lost by burning, however, the nickel film remains. Such porous nickel has a limit in refining the electrically conductive route.

In the case where the slurry including the hydrogen storage alloy is coated onto the pores of the current collector, porous nickel, to form the electrode, the minute electrically conductive net work is formed by the second phase in the inside of the powder particle of hydrogen storage alloy, as well as the electrical conductive route is constituted by the current collector. Therefore, the partial electric conductive dispersion is further reduced in the electrode, and the conductivity becomes uniform. This allows the electrode to reduce the internal resistance of the battery and to improve electrical conductivity.

(Battery Using Other Hydrogen Storage Alloy)

Next hydrogen storage alloy includes Mo, having the whole composition expressed by the formula of $MmNi_{(3.55+i)}Al_{(0.3+j)}Co_{(0.75+k)}Mn_{(0.4+l)}Mo(m)$. The "y" value is changed in the range of the formula of $0.5<y=(i+j+k+l+m)\leq 3$, when (i+j+k+l+m)=y.

The present inventor also carried out the similar test about this hydrogen storage alloy. That is to say, the standard is the hydrogen storage alloy having the composition of Comparable Example C, having Base 2 corresponding to No.10 shown in Table 4. In Base 2, "i"–"m" values are 0 respectively, and the "y" value is 0. Therefore, Base 2 has the formula of $MmNi_{3.55}Al_{0.3}Co_{0.75}Mn_{0.4}$. No.10, Base 2, has a phase rate 0 wt % as for the second phase. In comparable Example D, No.11, the "y" value is as small as 0.3, and the second phase rate is 4.8 wt %. The present inventor adjusted alloying elements with respect to Base 2 to obtain the hydrogen storage alloys of No.12–No.17 corresponding to the present invention. In No.12–No.17, the total quantity of ratio of the number of atoms of (Ni+Al+CO+Mn+Mo) is 5.8–7.8, and Ni is 3.5 or more.

The present inventor examined the internal structure of hydrogen storage alloy concerning No.12–No.17, which correspond to the present invention, by X-ray diffraction (XRD). X-ray diffraction indicates that the hydrogen storage alloy is composed of the second phase having the crystal structure of $\mu$-NiMoCo type or $Co_7Mo_6$ type, and that the hydrogen storage alloy phase is expressed by the general formula of $AB_5$. The second phase is formed by the network so as to have rich conductivity.

Using the hydrogen storage alloy having the composition shown in Table 4, the present inventor respectively produced the negative electrodes by the producing technique concerning Examples 1–12 shown in Table 2. The present inventor similarly examined the battery having the negative electrodes about the power density ratio. In this case, the "y" values are 0.5, 1, 1.5, 2.5, respectively.

Figure 4:
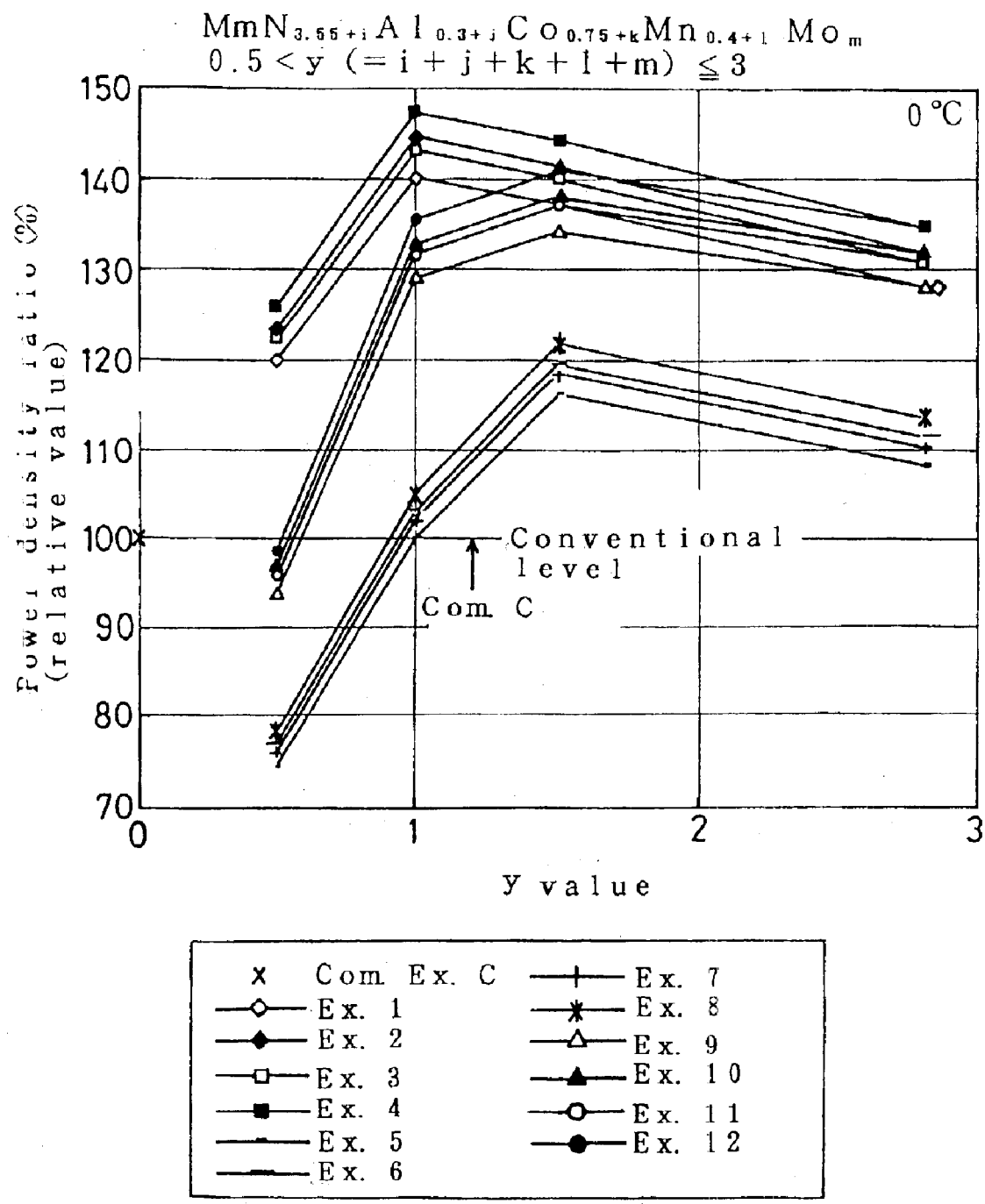
FIG. 4 is a graph which shows a relationship between "y" value (y=i+j+k+l+m) and power density ratio at 0° C.
Figure 5:
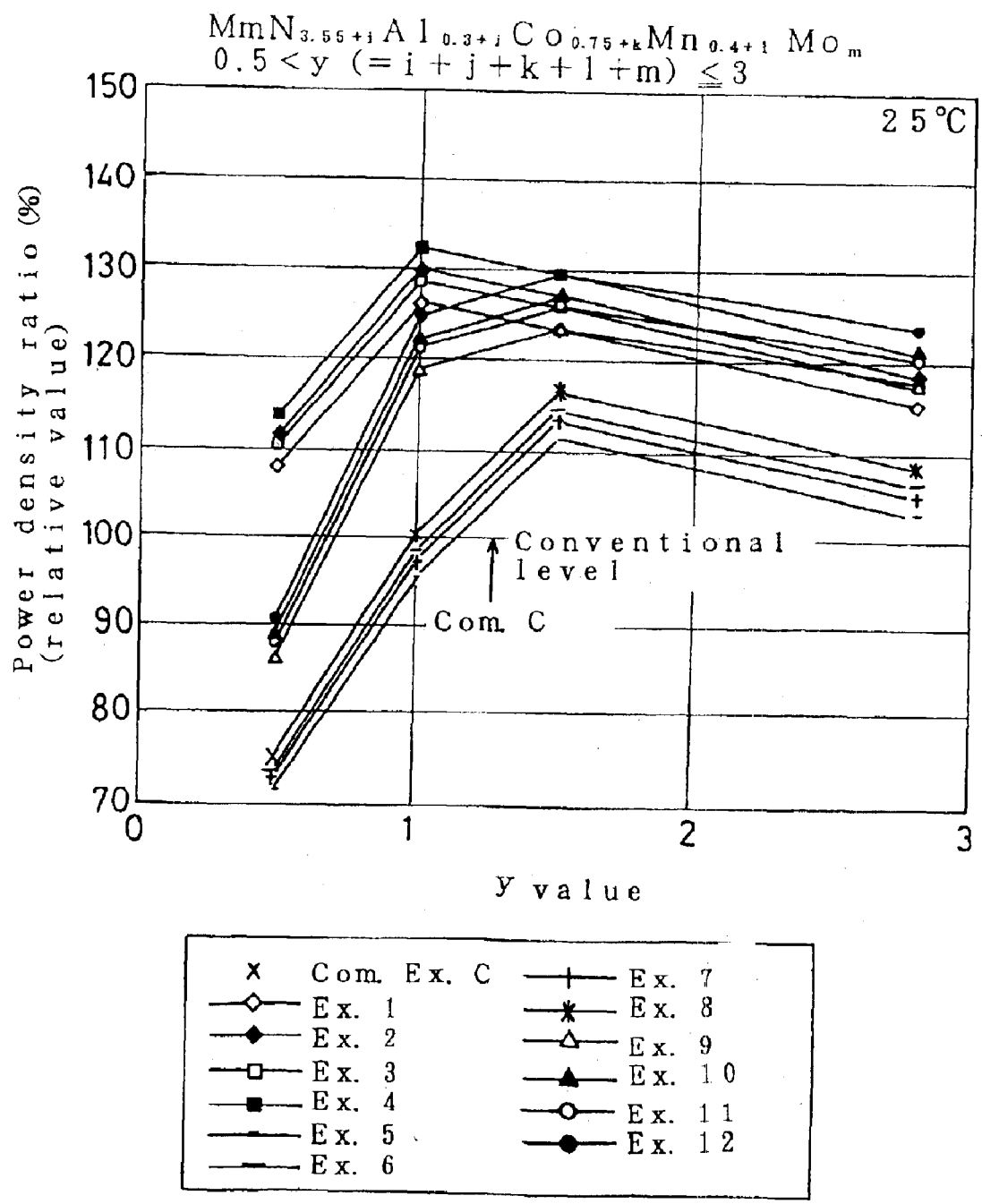
FIG. 5 is a graph which shows a relationship between "y" value (y=i+j+k+l+m) and power density ratio at 25° C.

FIGS. 4 and 5 show the test results of power density ratio of the battery having the negative electrode produced by the producing technique corresponding to Examples 1–12. FIG. 4 shows the test results at 0° C. FIG. 5 shows the test results at 25° C. Comparable Example C shown by a "X" mark in FIGS. 4 and 5 means the battery having the negative electrode which uses the hydrogen storage alloy of No.10 composition (conventional composition) shown in Table 4 and which uses Comparable Example 1 (machine crushing+binder material+current collector) shown in Table 2. In FIGS. 4 and 5, the vertical line shows the relative value; wherein power density of the battery and the negative electrode formed by the producing technique concerning Comparable Example C is set at 100%. The horizontal line in FIGS. 4 and 5 show the "y" value (y=i+j+k+l+m). With an increase of the "y" value, the power density ratio increases in Examples 1–12, as understood from the characteristic lines of FIG. 4—FIG. 4 shows a test temperature of 0° C. and FIG. 5 shows a test temperature of 25° C. When the "y" value is in the range of 0.5–3, the result is good. Especially, the power density ratio increases, when the "y" value is at 1 and 1.5. When the "y" value is excessive, the proportion of the hydrogen storage alloy phase relatively decreases, and the second phase having the good conductivity increases; so, the power density ratio of the battery became lower. According to the characteristic line of FIG. 5 in which the test temperature is 25° C., the power density ratio is less than 140%. According to the characteristic line of FIG. 4 in which the test temperature is 0° C., the power density ratio sometimes exceeds 140%. In other words, as understood from the characteristic lines of FIGS. 4 and 5, the power density in FIG. 4 showing a test temperature of 0° C. is unproved compared to FIG. 5 showing a test temperature of 25° C. Therefore, the hydrogen storage alloy concerning the present invention is improved in power characteristics in low-temperatures than that of the conventional technique.

By the way, the hydrogen storage alloy concerning the present example is suitable for the battery of a hybrid automobile which mainly uses both of a motor and an internal combustion engine. The hybrid automobile requires that much electricity is charged and discharged with respect to the battery at one time. The ability is generally shown as battery power. Also, the automobile places restrictions on volume and weight to demand compactification. Therefore, the battery used in the hybrid automobile requires high power density in terms of battery power per unit weight or per unit mass. In the general battery, power is lower at low-temperatures. Also, the automobile, being used in outdoor environments, requires power density at low-temperatures. According to the battery with the negative electrode composed of the hydrogen storage alloy having compositions shown in Table 1, a good conductive network is obtained by the second phase, the internal resistance is reduced to improve electrical conductivity, and power density of the battery increases. Especially, the hydrogen storage alloy concerning the present invention can improve power at low-temperatures and high-speed charging.

(Calculation of Phase Rate of Second Phase)

Calculation of the phase rate of the second phase will be explained hereinafter with an example of the $AlNi_3$ phase in described Table 1.

It is considered that the hydrogen storage alloy has the hydrogen storage alloy phase and the second phase. It is assumed that the hydrogen storage alloy phase has the formula of $MmNi_{3.55}Al_{0.30}Co_{0.75}Mn_{0.4}$. The second phase has the remainder which is constituted by removing the composition of hydrogen storage alloy phase from the whole composition. The phase rate of second phase means "second phase/hydrogen storage alloy" by weight.

(Conductive Network)

Figure 6:
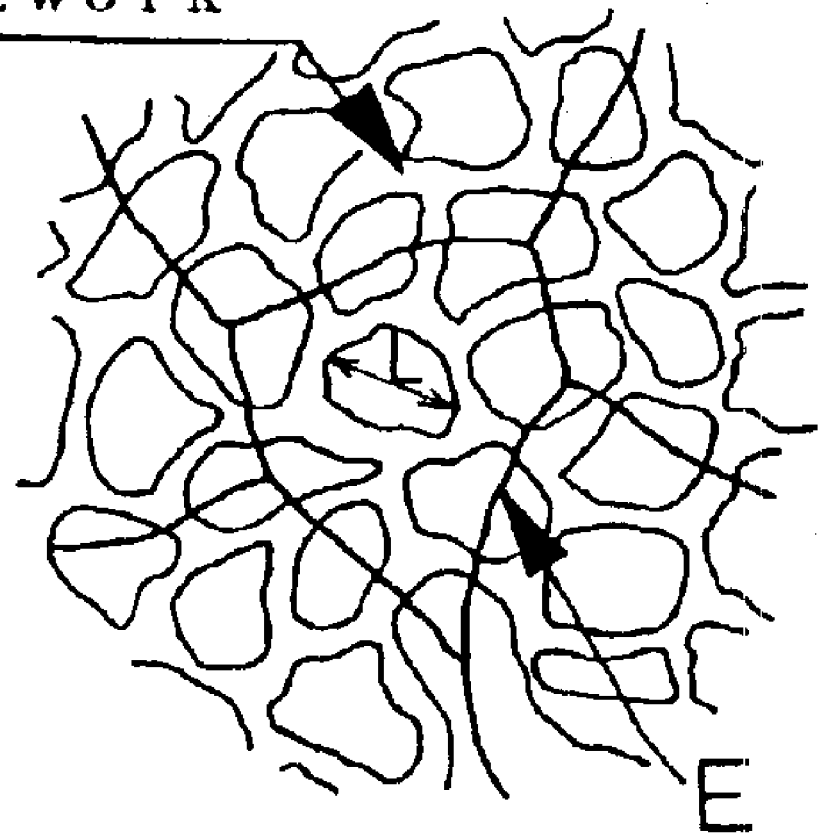
FIG. 6 is a configuration which schematically shows an example of conductive network.

FIG. 6 schematically shows an example of second phase with electrical conductivity. In FIG. 6, the second phase with conductivity forms a conductive network. The conductive network includes both a two-dimensional network, and a three-dimensional network which is sometimes illustrated to have a cut in a two-dimensional cross section. In the hydrogen storage alloy concerning the present example, an average value of "L" is minute, expressing a conductive network distance. Especially, the conductive network is minuter—the hydrogen storage alloy, which is rapidly solidified, precipitates the second phase in a grain boundary by heat-treatment. In this case, the average value of "L", in many cases, does not exceed 30 μm, 20 μm, 10 μm, 7 μm, and 4 μm. This was confirmed by EPMA analysis. When hydrogen storage alloy is crushed by hydrogenation—expansion is generated by hydrogen storage and contraction is generated by hydrogen emission—the powder particle of hydrogen storage alloy is further crushed by expansion and contraction to generate cracks so as to effectively crush the hydrogen storage alloy phase. So, the second phase constituting a conductive network, buried in the inside of the hydrogen storage alloy phase, is easily exposed by crushing. Therefore, when the powder particle of hydrogen storage alloy is sintered by weld-sintering or by furnace-sintering without using binder material, the second phases are directly connected to have good conductivity. "E" shown in FIG. 6 schematically shows cracks caused by hydrogenation for further crushing.

(Other Mode of Hydrogen Storage Alloy)

Next hydrogen storage alloy, decreasing Co whose cost is expensive, increases Cu and Ni in order to add Cu and Ni to partially replace Co. That is to say, this hydrogen storage alloy is expressed by the formula of Mm–(Ni–Al–Co–Mn–Cu). So, the total quantity of (Ni–Al–Co–Mn–Cu) is expressed by $5.5 < (Ni+Al+Co+Mn+Cu) \leq 7.0$, and $4.0 \leq Ni$, when Mm is set at 1 by a ratio of the number of atoms. Also, the structure is composed of the hydrogen storage alloy phase having the general formula of $AB_5$, and the second phase which exists in the hydrogen storage alloy phase. In this case, the second phase generally has a crystal structure of Ni type or $AlNi_3$ type.

Base 3, Comparable Example E, has the formula of $MmNi_{3.95}Al_{0.3}Co_{0.4}Mn_{0.45}Cu_{0.10}$. Then, the metallic additive containing Al, Ni, Co, Mn as a major component was used. By mixing this metallic additive with Base 3, the compositions of No.22–No.27 shown in Table 5 were adjusted. The additive has a composition of $Al_{7.37}Ni_{54.42}Co_{17.36}Mn_{20.86}$. It is possible to express the whole composition of No.21–No.27 as $MmNi_{(3.95+p)}Al_{(0.3+q)}Co_{(0.4+r)}Mn_{(0.45+s)}Cu_{(0.10+t)}$. That is to say values of "p", "q", "r", "s", and "t" are 0 in Base 3, respectively. As understood from Table 5, the adjusted range is expressed by $0.3 < (p+q+r+s+t) \leq 1.8$.

Figure 7:
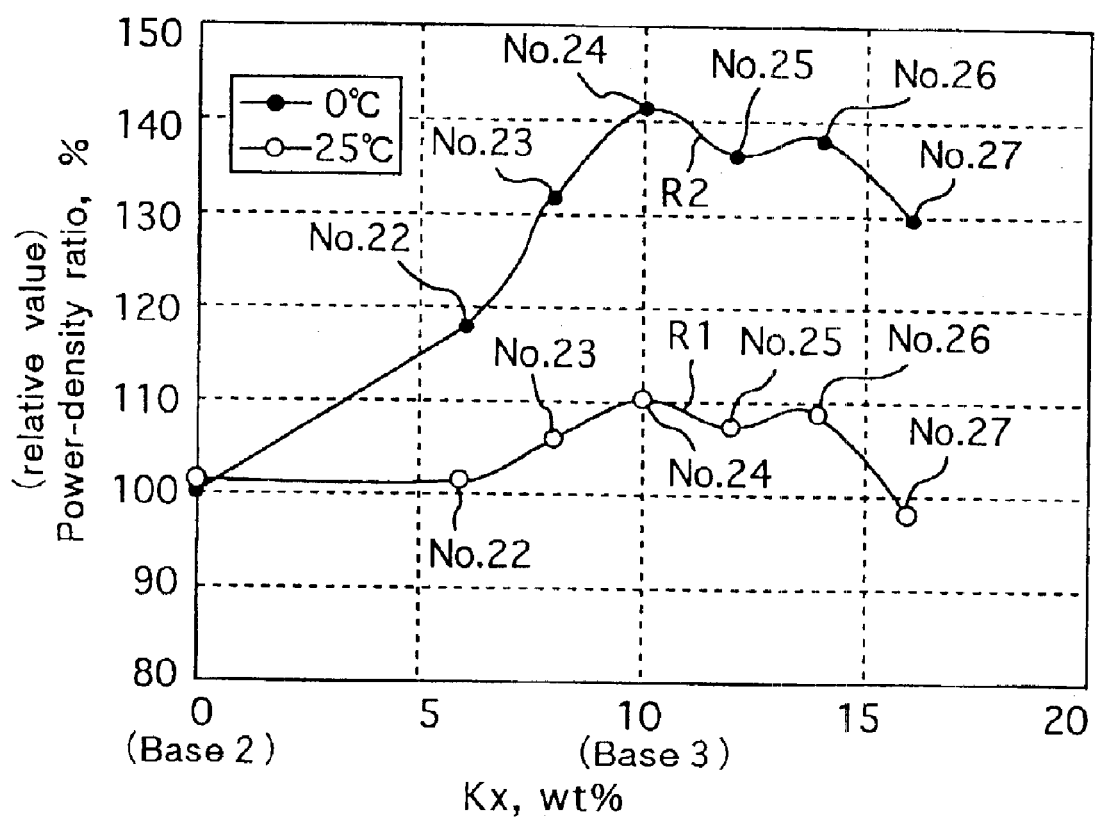
FIG. 7 is a graph which shows a relationship between an additive amount and power density ratio at 0° C. and 25° C.

The present inventor formed ingots by solidifying the molten metal having the compositions of No.21–No.27 shown in Table 5, respectively. The present inventor crushed each of the ingots to produce the alloy powder. After that, the present inventor formed the slurry by mixing CMC (carboxymethylcellulose) working as binder material, alcohol and water working as a solvent, and the above-mentioned alloy powder. Next, the present inventor produced the negative electrode by coating the slurry onto pores of the current collector made of porous nickel. That is to say, the electrode (negative electrode) was produced based on the process of the item ① shown in Table 2, and the process of item ⑥ shown in Table 2. By using the battery having this negative electrode, the present inventor measured power density (W/kg) of the battery at 0° C. and 25° C. to show the result in Table 5. Output density (W/kg) means power which can be generated per unit mass of battery. FIG. 7 shows the test results. The vertical line of FIG. 7 shows the relative power density ratio. The horizontal line of FIG. 7 shows the additive amount being added to Base 3. "Addi. 10 wt %", namely, additives 10 wt %, means the composition of Base 3 is 90 wt % and additive is 10 wt %. In FIG. 7, the characteristic line R1 shows power density ratio at 25° C., and the characteristic line R2 shows power density at 0° C. As understood from the characteristic lines R1 and R2 shown in FIG. 7, the power density ratio of the battery increases with an increase of the additives. In comparison with the characteristic line R1 (test temperature: 25° C.) and the characteristic line R2 (test temperature: 0° C.), the characteristic line R2 exhibits an increasing tendency in power density ratio. This means that the present mode of hydrogen storage alloy shows improvement in power of the battery at low-temperatures. As understood from FIG. 7, when the additive amount is represented by "Kx", 5 wt $\% \leq Kx \leq 17$ wt % is preferable. Especially, 8 wt $\% \leq Kx \leq 15$ wt % is preferable. In other words, the vicinity of No.12, No.24, No.25, No.26 and No.27 are good.

By the way, for avoiding a rise of internal pressure caused by repetition cycles, it is preferable that hydrogen equilibrium pressure is low in the hydrogen storage alloy.

FIG. 7 shows that No.24 (additives: 10 wt %), namely Base 4, is best in power density. So, using No.24 as a basic material, the present inventor added Mn to No.24 to adjust No.28–No.30 compositions shown in Table 5. In No.28, "Add 0.2 Mn" means that 0.2 of Mn is added to the composition of Base 4 when Mm is set at 1 by ratio of the number of atoms. Then, the present inventor solidifies the molten metal concerning No.28–No.30 to form ingots, forming the powder of hydrogen storage alloy by crushing the ingot.

Containing the powder in a vessel, the present inventor carried out a hydrogen equilibrium pressure test (test temperature: 40° C.) to measure P-T-C characteristics (pressure-hydrogen concentration-isothermal diagram) and to obtain a hydrogen equilibrium pressure based on this characteristics.

Similarly, the present inventor adjusted the compositions concerning No.31–No.33 shown in Table 5, by increasing Al to Base 4. In No.31, "Add 0.2 Al" means that 0.2 of Al is added to the composition of Bases 4 when Mm is set at 1 by ratio of the number of atoms.

Then, the present inventor solidified the molten metal concerning No.31–No.33 to form ingots, forming the powder of hydrogen storage alloy by crushing the ingot. The present inventor carried out the hydrogen equilibrium pressure test (test temperature: 40° C.) to measure P-T-C characteristics.

Figure 8:
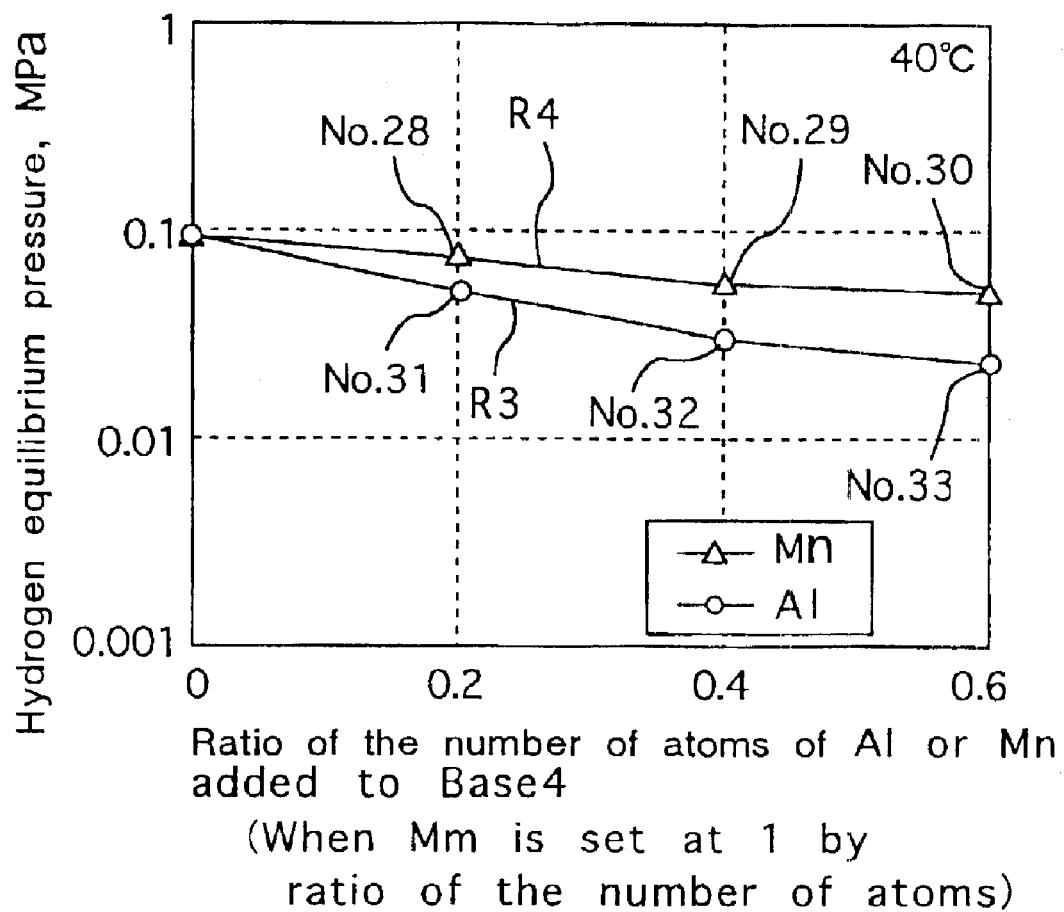
FIG. 8 is a graph which shows a hydrogen equilibrium pressure of hydrogen storage alloy in increasing Mn, Al in hydrogen storage alloy.

FIG. 8 shows these test results. The horizontal line of FIG. 8 shows a ratio of the number of atoms of Al or Mn added to the composition of Base 4, when Mm is set at 1 by ratio of the number of atoms. The vertical line of FIG. 8 shows a hydrogen equilibrium pressure of the hydrogen storage alloy. The characteristic line R3 of FIG. 8 shows changes of hydrogen equilibrium pressure of hydrogen storage alloy when Al increases. The characteristic line R4 of FIG. 8 shows changes of the hydrogen equilibrium pressure of hydrogen storage alloy when Mn increases. FIG. 8 indicates that the hydrogen equilibrium pressure of hydrogen storage alloy gradually decreases with an increase of Mn and Al.

Figure 9:
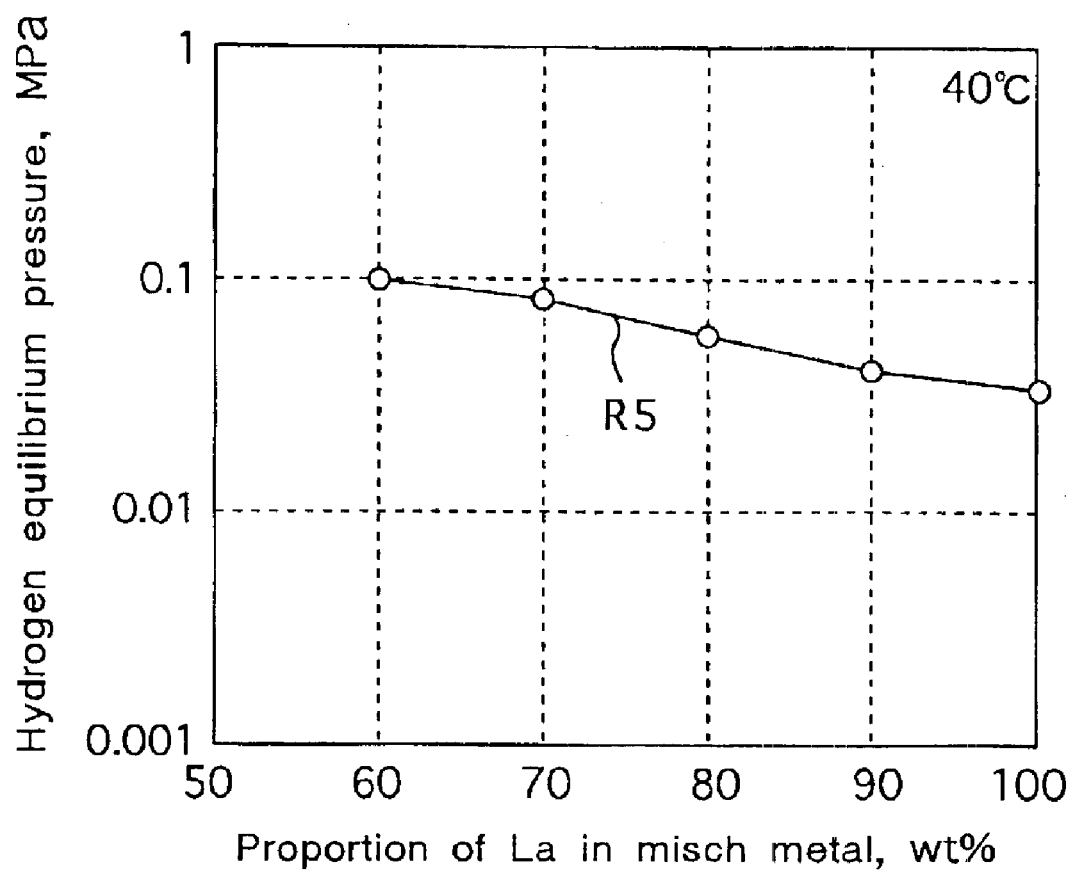
FIG. 9 is a graph which shows an equilibrium pressure of hydrogen storage alloy in increasing La in misch metal of hydrogen storage alloy.

Also, the present inventor produced hydrogen storage alloys in which ratios of La being occupied in misch metal concerning Base 4 were changed to 60%, 70%, 80%, 90% (No.34), and 100% (No.35), respectively. The present inventor produced the powder of hydrogen storage alloy by the above-mentioned procedure, carrying out the hydrogen equilibrium pressure test (test temperature: 40° C.) to measure a hydrogen equilibrium pressure. FIG. 9 shows these test results. In FIG. 9, the horizontal line shows the proportion of La being occupied in the misch metal, and the vertical line shows a hydrogen equilibrium pressure of hydrogen storage alloy. The characteristic line 5 of FIG. 9 indicates that the hydrogen equilibrium pressure of hydrogen storage alloy gradually decreases when the proportion of La being occupied in misch metal is increased

APPLICATION EXAMPLE

Figure 10:
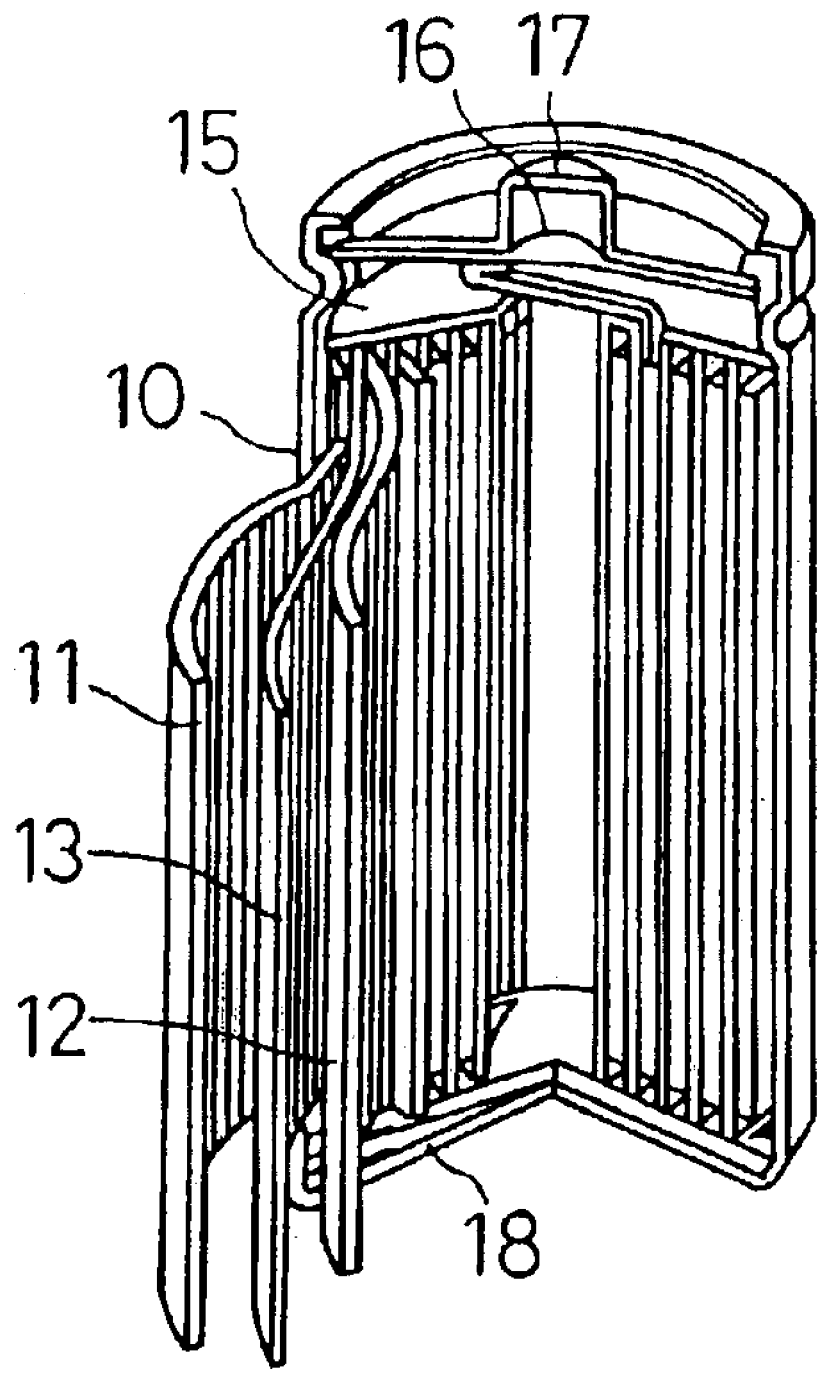
FIG. 10 is an analyzing drawing which shows an application example applied to a battery.

FIG. 10 shows an example in which a nickel-hydrogen battery is a closed-type. In this example, there is a container 10 having the negative electrode 11 composed of the above-mentioned hydrogen storage alloy and the positive electrode 12 mainly composed of Ni. The positive electrodes 12 and the negative electrodes 11 are partitioned by separators 13 formed by nonwoven fabric such as polypropylene. The container 10 holds an alkali aqueous solution (KOH solution) working as an electrolyte. The battery concerning this example is an alkaline battery.

15: spacer
16: safety valve
17: positive electrode terminal
18: positive electrode terminal

TABLE 1

| No. | Mm | Composition: when Mm is set at 1 in ratio of the number of atoms | | | | | | Phase rate, Second Phase, wt % | |
|---|---|---|---|---|---|---|---|---|---|
| | | Ni a | Al b | Co c | Mn d | Ni + Al + Co + Mn X = a + b + c + d | | | |
| No. 1 | 1 | 3.55 0 | 0.30 0 | 0.75 0 | 0.4 0 | 5.0 | 0 | 0 | Com.Ex.A = Base1 |
| No. 2 | 1 | 3.93 0.38 | 0.43 0.13 | 0.75 0 | 0.4 0 | 5.5 | 0.5 | 5.7 | Com.EX.B |
| No. 3 | 1 | 4.30 0.75 | 0.55 0.25 | 0.75 0 | 0.4 0 | 6.0 | 1 | 10.7 | INVENTION |
| No. 4 | 1 | 4.68 1.13 | 0.68 0.38 | 0.75 0 | 0.4 0 | 6.5 | 1.5 | 15.3 | |
| No. 5 | 1 | 5.05 1.50 | 0.80 0.50 | 0.75 0 | 0.4 0 | 7.0 | 2 | 19.4 | |
| No. 6 | 1 | 5.43 1.88 | 0.93 0.63 | 0.75 0 | 0.4 0 | 7.5 | 2.5 | 23.1 | |
| No. 7 | 1 | 5.80 2.25 | 1.05 0.75 | 0.75 0 | 0.4 0 | 8.0 | 3 | 16.5 | |
| No. 8 | 1 | 6.18 2.63 | 1.18 0.88 | 0.75 0 | 0.4 0 | 8.5 | 3.5 | 19.6 | |
| No. 9 | 1 | 6.55 3.00 | 1.30 1.00 | 0.75 0 | 0.4 0 | 9.0 | 4 | 32.5 | |

TABLE 2

| | Producing Technique for Hydrogen Storage Alloy | | | | Producing Technique for Electrode by Using Hydrogen Storage Alloy Powder | | | |
|---|---|---|---|---|---|---|---|---|
| | Ingot Technique | | Rapid Solidification · Heat Treatment ③ | | | | | |
| | ① crushing | ② crushing hydrogenation | ④ crushing | ⑤ crushing hydrogenation | ⑥ binder material | ⑥ current collector | ⑦ energization sintering | ⑧ furnace sintering |
| Example1 | ○ | | | | ○ | ○ | | |
| Example2 | | | ○ | | ○ | ○ | | |
| Example3 | | ○ | | | ○ | ○ | | |
| Example4 | | | | ○ | ○ | ○ | | |
| Example5 | ○ | | | | | | ○ | |
| Example6 | | | ○ | | | | ○ | |
| Example7 | | ○ | | | | | ○ | |
| Example8 | | | | ○ | | | ○ | |
| Example9 | ○ | | | | | | | ○ |
| Ex. 10 | | | ○ | | | | | ○ |
| Ex. 11 | | ○ | | | | | | ○ |
| Ex. 12 | | | | ○ | | | | ○ |
| Com.Ex. 1 | ○ | | | | ○ | ○ | | |
| | ① | ② | ③ | ④ | ⑤ | ⑥ | ⑦ | ⑧ |

Ex. means Example.
Com.Ex. means Comparative Example.
○ means being carried out.

TABLE 3

| | Internal Resistance of Battery (relative value) | | |
|---|---|---|---|
| Temperature | Comparative Example (x = 0, y = 0) | x = 1.5 y = a + b + c + d | y = 1.0 y = i + j + k + l + m |
| 0° C. | 100% → | 80.4% | 94.7% |

TABLE 3-continued

| | Internal Resistance of Battery (relative value) | | |
|---|---|---|---|
| Temperature | Comparative Example (x = 0, y = 0) | x = 1.5 y = a + b + c + d | y = 1.0 y = i + j + k + l + m |
| 25° C. | 100% → | 78.2% | 74.2% |

TABLE 4

| | Composition: when Mm is set at 1 in ratio of the number of atoms | | | | | | | Phase | |
|---|---|---|---|---|---|---|---|---|---|
| No | Mm | Ni i | Al j | Co k | Mn l | Mo m | Ni + Al + Co + Mn + Mo | y = i + j + k + l + m | Rate, wt % | |
| No 10 | 1 | 3.55 0 | 0.3 0 | 0.75 0 | 0.4 0 | 0.00 0 | 5.0 | 0 | 0 | Com.Ex.C Base 2 |
| No 11 | 1 | 3.65 0.10 | 0.3 0 | 0.85 0.10 | 0.4 0 | 0.10 0.10 | 5.3 | 0.3 | 4.8 | Com.Ex.D |
| No 12 | 1 | 3.81 0.26 | 0.3 0 | 1.01 0.26 | 0.4 0 | 0.26 0.26 | 5.8 | 0.8 ≈ 078 | 11.9 | INVENTION |
| No 13 | 1 | 3.98 0.43 | 0.3 0 | 1.18 0.43 | 0.4 0 | 0.43 0.43 | 6.3 | 1.3 ≈ 1.29 | 18 | |
| No 14 | 1 | 4.14 0.59 | 0.3 0 | 1.34 0.59 | 0.4 0 | 0.59 0.59 | 6.8 | 1.8 ≈ 1.77 | 23.3 | |
| No 15 | 1 | 4.31 0.76 | 0.3 0 | 1.51 0.76 | 0.4 0 | 0.76 0.76 | 7.3 | 2.3 ≈ 2.28 | 27.9 | |
| No 16 | 1 | 4.41 0.86 | 0.3 0 | 1.61 0.86 | 0.4 0 | 0.86 0.86 | 7.6 | 2.6 ≈ 2.58 | 30.5 | |
| No 17 | 1 | 4.47 0.92 | 0.3 0 | 1.67 0.92 | 0.4 0 | 0.92 0.92 | 7.8 | 2.8 ≈ 2.76 | 32 | |

TABLE 5

| | Composition: Mm is set at 1 in ratio of the number of atoms | | | | | | Power Density W/kg | | |
|---|---|---|---|---|---|---|---|---|---|
| | | Ni | Al | Co | Mn | Cu | A B X | | |
| | Mm | p | q | r | s | t | x = p + q + r + s + t | 0° C. | 25° C. |
| No. 21 Base 3 = Com.E | 1 | 3.95 0 | 0.30 0 | 0.40 0 | 0.45 0 | 0.10 0 | 5.20 | 986 | 2017 |
| No. 22 Base 3 + Addi.6% | 1 | 4.22 0.27 | 0.34 0.04 | 0.49 0.09 | 0.55 0.10 | 0.10 0 | 5.70 0.5 | 1164 | 2037 | INVENTION
| No. 23 Base 3 + Addi.8% | 1 | 4.32 0.37 | 0.35 0.05 | 0.52 0.12 | 0.59 0.14 | 0.10 0 | 5.88 0.68 | 1303 | 2131 |
| No. 24 Base 3 + Addi.10% = Base 4 | 1 | 4.42 0.47 | 0.36 0.06 | 0.55 0.15 | 0.63 0.18 | 0.10 0 | 6.07 0.86 | 1395 | 2220 |
| No. 25 Base 3 + Addi.12% | 1 | 4.53 0.58 | 0.38 0.08 | 0.58 0.18 | 0.67 0.22 | 0.10 0 | 6.27 1.06 | 1347 | 2161 |
| No. 26 Base 3 + Addi.14% | 1 | 4.64 0.69 | 0.39 0.09 | 0.62 0.22 | 0.71 0.26 | 0.10 0 | 6.47 1.26 | 1364 | 2192 |
| No. 27 Base 3 + Addi.16% | 1 | 4.76 0.81 | 0.41 0.11 | 0.66 0.26 | 0.76 0.31 | 0.10 0 | 6.69 1.49 | 1279 | 1981 |
| No. 28 Base 4 + Add 0.2Mn | 1 | 4.42 0.47 | 0.36 0.06 | 0.55 0.15 | 0.83 0.38 | 0.10 0 | 6.27 1.06 | — | — | INVENTION
| No. 29 Base 4 + Add.0.4Mn | 1 | 4.42 0.47 | 0.36 0.06 | 0.55 0.15 | 1.03 0.58 | 0.10 0 | 6.47 1.26 | — | — |
| No. 30 Base 4 + Add 0.6Mn | 1 | 4.42 0.47 | 0.36 0.06 | 0.55 0.15 | 1.23 0.78 | 0.10 0 | 6.67 1.46 | — | 2383 |
| No. 31 Base 4 + Add 0.2Al | 1 | 4.42 0.47 | 0.56 0.26 | 0.55 0.15 | 0.63 0.18 | 0.10 0 | 6.27 1.06 | — | — |
| No. 32 Base 4 + Add 0.4Al | 1 | 4.42 0.47 | 0.76 0.46 | 0.55 0.15 | 0.63 0.18 | 0.10 0 | 6.46 1.26 | — | 2460 |
| No. 33 Base 4 + Add 0.6Al | 1 | 4.42 0.47 | 0.96 0.66 | 0.55 0.15 | 0.63 0.18 | 0.10 0 | 6.67 1.46 | — | — |
| No. 34 Base 4 (90 wt % La) | 1 | 4.42 0.47 | 0.36 0.06 | 0.55 0.15 | 0.63 0.18 | 0.10 0 | 6.07 0.86 | — | 2363 |
| No. 35 Base 4 (100 wt % La) | 1 | 4.42 0.47 | 0.36 0.06 | 0.55 0.15 | 0.63 0.18 | 0.10 0 | 6.07 0.86 | — | 2548 |

INDUSTRIAL UTILITY FIELD

The present invention can be utilized as a hydrogen storage alloy, a hydrogen storage alloy electrode, and a battery. Especially, it is possible to utilize a hydrogen storage alloy, a hydrogen storage alloy electrode, and a battery for an automobile which is sometimes used in low-temperature conditions.

What is claimed is:

1. Hydrogen storage alloy comprising:
   (1) a main alloy composition expressed by the formula of Mm-(Ni-Al-Co-Mn-Cu);
   (2) a ratio of the number of atoms expressed by the formula of Ni-Al-Co-Mn-Cu) is exhibited by 5.5< (Ni+Al+Co+Mn)≦7.0, and 4.0≦Ni, when Mm is set at 1 in a ratio of the number of atoms; and
   (3) an internal structure having a hydrogen storage alloy phase expressed by the general formula of $AB_5$, and a second phase existing in said hydrogen storage alloy phase, wherein said whole composition is expressed by the formula of $MmNi_{(3.95+p)}Al_{(0.3+q)}Co_{(0.4+r)}Mn_{(0.45+s)}Cu_{(0.10+t)}$, and $0.3<(p+q+r+s+t)≦1.8$.

2. Hydrogen storage alloy according to claim 1, wherein said second phase having a crystal structure exhibiting a Ni type or an $AlNi_3$ type.

3. Hydrogen storage alloy according to claim 1, wherein said composition satisfies at least one of the condition of (q>0.06) and the condition of (s>0.18), as for "q" concerning Al and "s" concerning Mn.

4. Hydrogen storage alloy according to claim 1, wherein La occupies at least 60% by weight in Mm.

5. A process for producing hydrogen storage alloy, which comprises the steps of:
   employing a molten metal of said hydrogen storage alloy according to claim 1;
   solidifying said molten metal at a rapid cooling speed to form a solidified hydrogen storage alloy; and
   keeping said solidified hydrogen storage alloy in a range from 1000 to 1200° C. for 30 minutes–120 hours to precipitate a second phase having a network state.

6. A process for producing hydrogen storage alloy, which comprises the steps of:
employing a molten metal of said hydrogen storage alloy according to claim 1;
solidifying said molten metal to form a lump body;
crushing said lump body to form a crushed hydrogen storage alloy; and
hydrogenating said crushed hydrogen storage alloy for further crushing.

7. Hydrogen storage alloy electrode, characterized by a material constituted by said hydrogen storage alloy according to claim 1.

8. A process for producing hydrogen storage alloy electrode, which comprises the steps of:
employing said hydrogen storage alloy having a powder shape and having a composition according to claim 1;
forming a mixture in which said hydrogen storage alloy and binder material are mixed; and
combining said mixture with a current collector to form a hydrogen storage alloy electrode.

9. A process for producing hydrogen storage alloy electrode, which comprises the steps of:
employing a hydrogen storage alloy having a powder shape and having a composition according to claim 1;
combining said hydrogen storage alloy with a current collector without using binder material; and
sintering said hydrogen storage alloy with said current collector to form a hydrogen storage alloy electrode.

10. A process for producing hydrogen storage alloy electrode, which comprises the steps of:
employing a hydrogen storage alloy having a powder shape and having a composition according to claim 1;
compressing said hydrogen storage alloy by press-working to form a compressed body without using binder material and without using a current collector; and
sintering said compressed body to form a hydrogen storage alloy electrode.

11. A battery, comprising a negative electrode generating a negative electrode reaction and a positive electrode generating a positive electrode reaction, wherein said negative electrode is characterized by said hydrogen storage alloy having a composition according to claim 1.

12. Hydrogen storage alloy according to claim 7, the formula of (Ni–Al–Co–Mn–Cu) is exhibited by $5.6<(Ni+Al+Co+Mn-Cu)\leqq 7.0$.

* * * * *

UNITED STATES PATENT AND TRADEMARK OFFICE
CERTIFICATE OF CORRECTION

PATENT NO. : 6,942,947 B2 Page 1 of 1
DATED : September 13, 2005
INVENTOR(S) : Kenji Nakamura It is certified that error appears in the above-identified patent and that said Letters Patent is hereby corrected as shown below:

<u>Column 21,</u>
Line 62, delete "Ni+Al+Co+Mn" and insert -- Ni+Al+Co+Mn+Cu --.

Signed and Sealed this

Twenty-first Day of March, 2006

JON W. DUDAS
*Director of the United States Patent and Trademark Office*